Nov. 1, 1932.　　　A. BAUMANN ET AL　　　1,886,148
CALCULATING MACHINE
Filed April 11, 1927　　　19 Sheets-Sheet 1
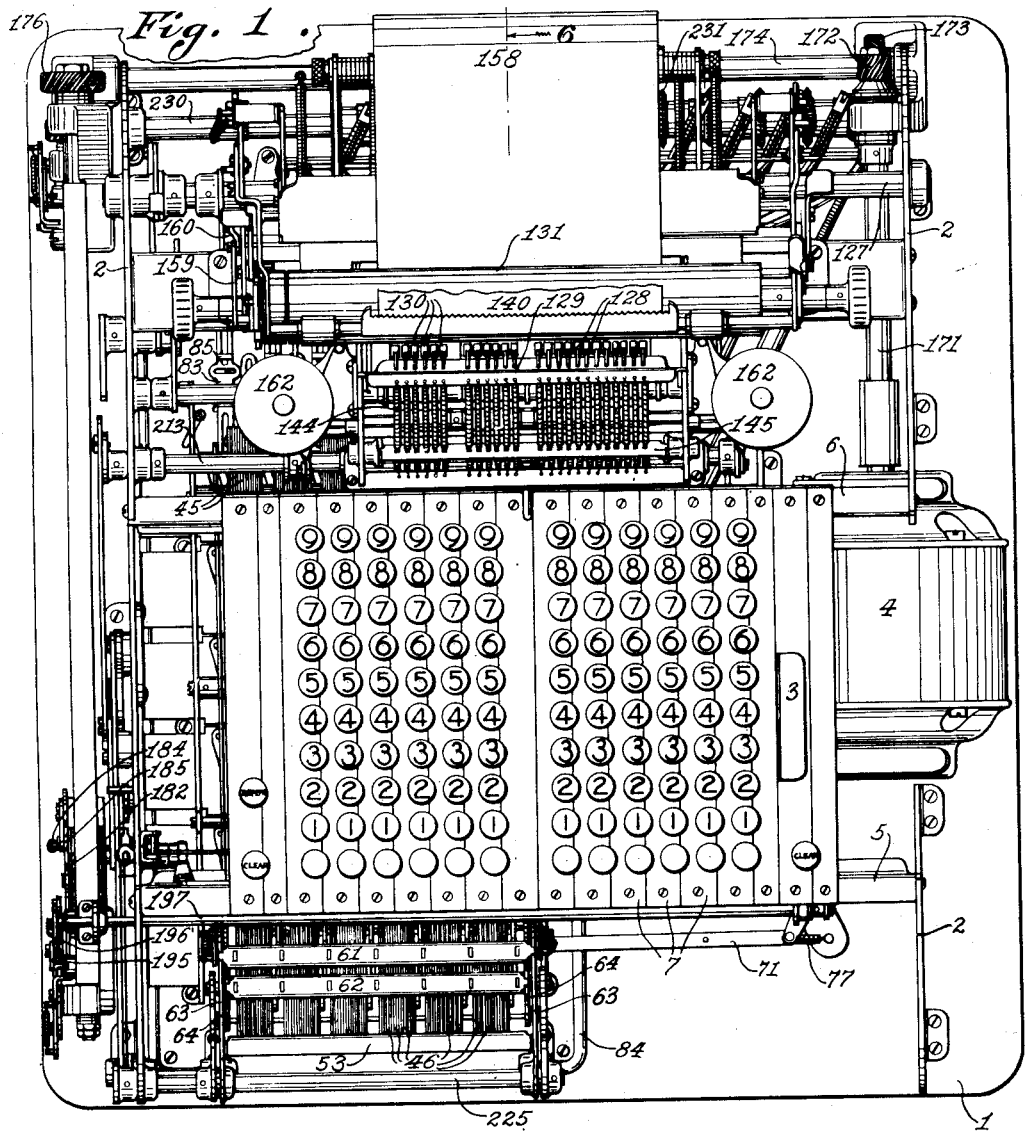

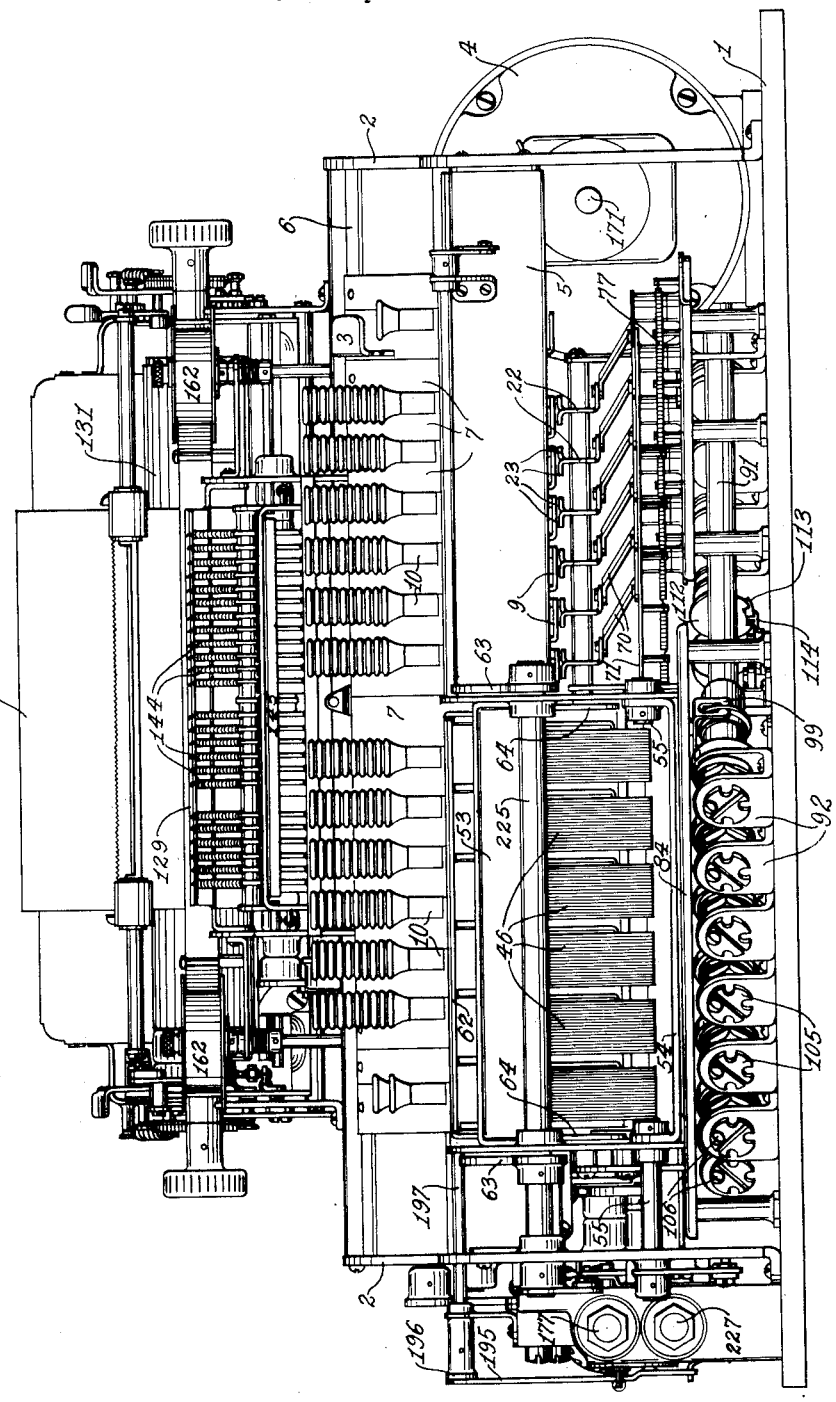

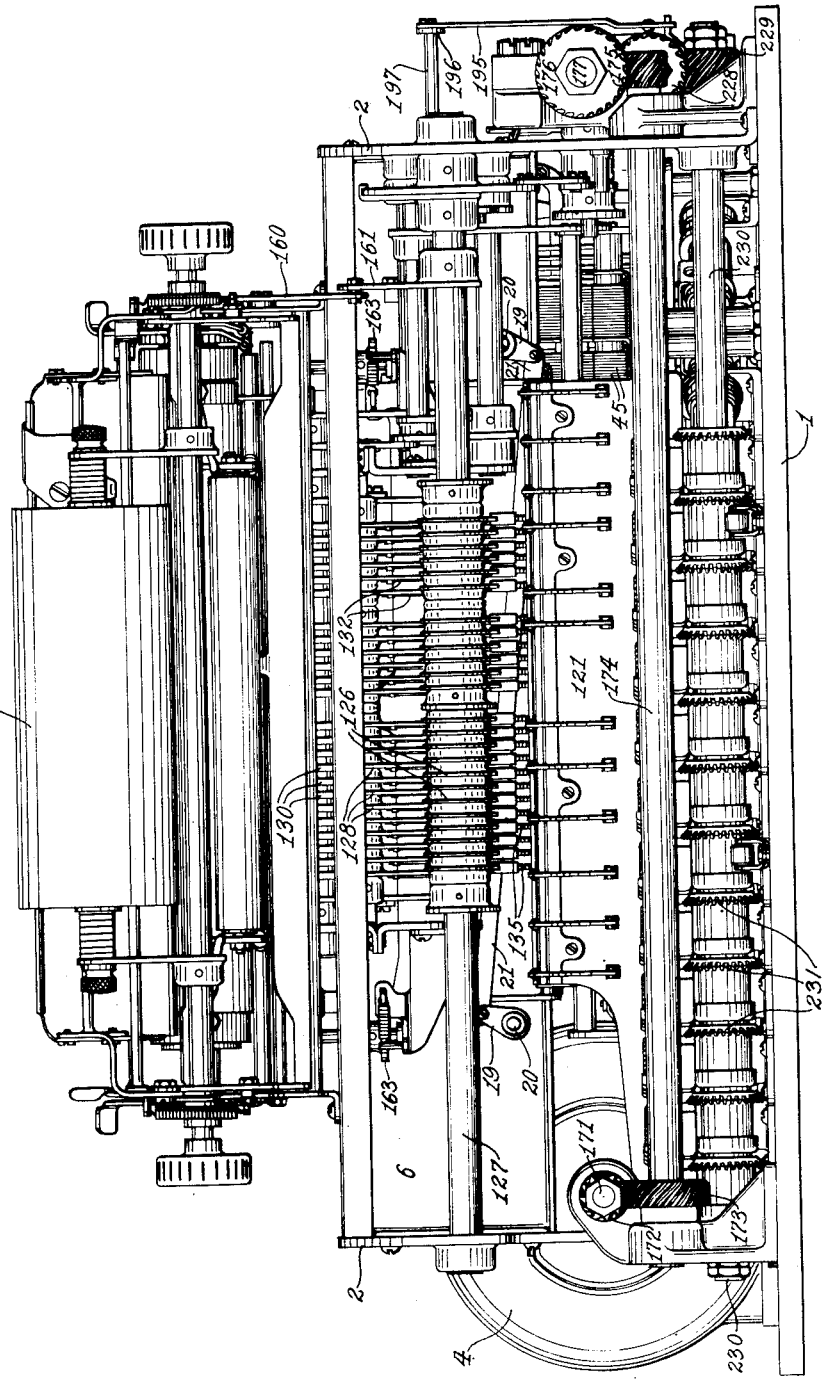

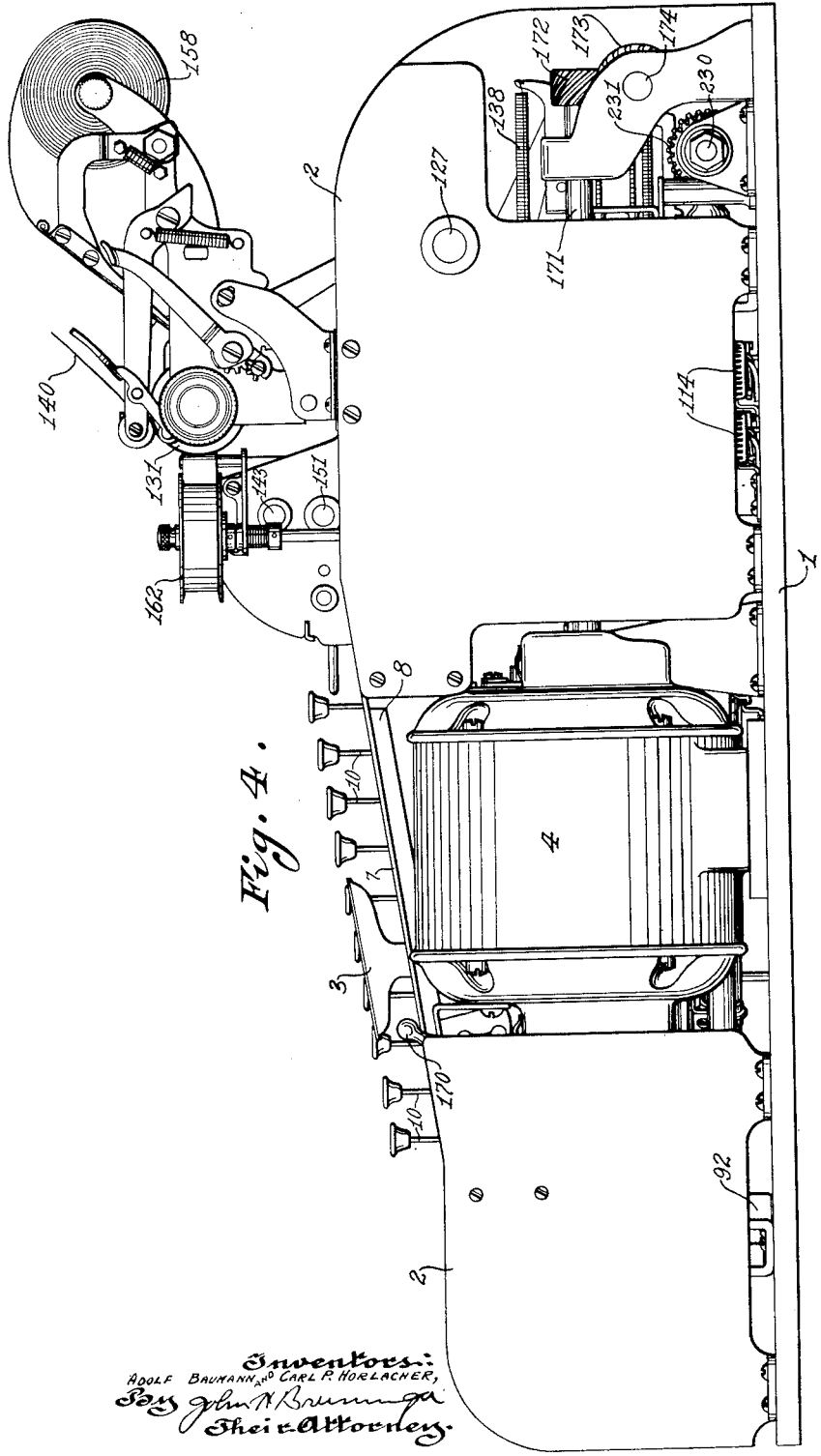

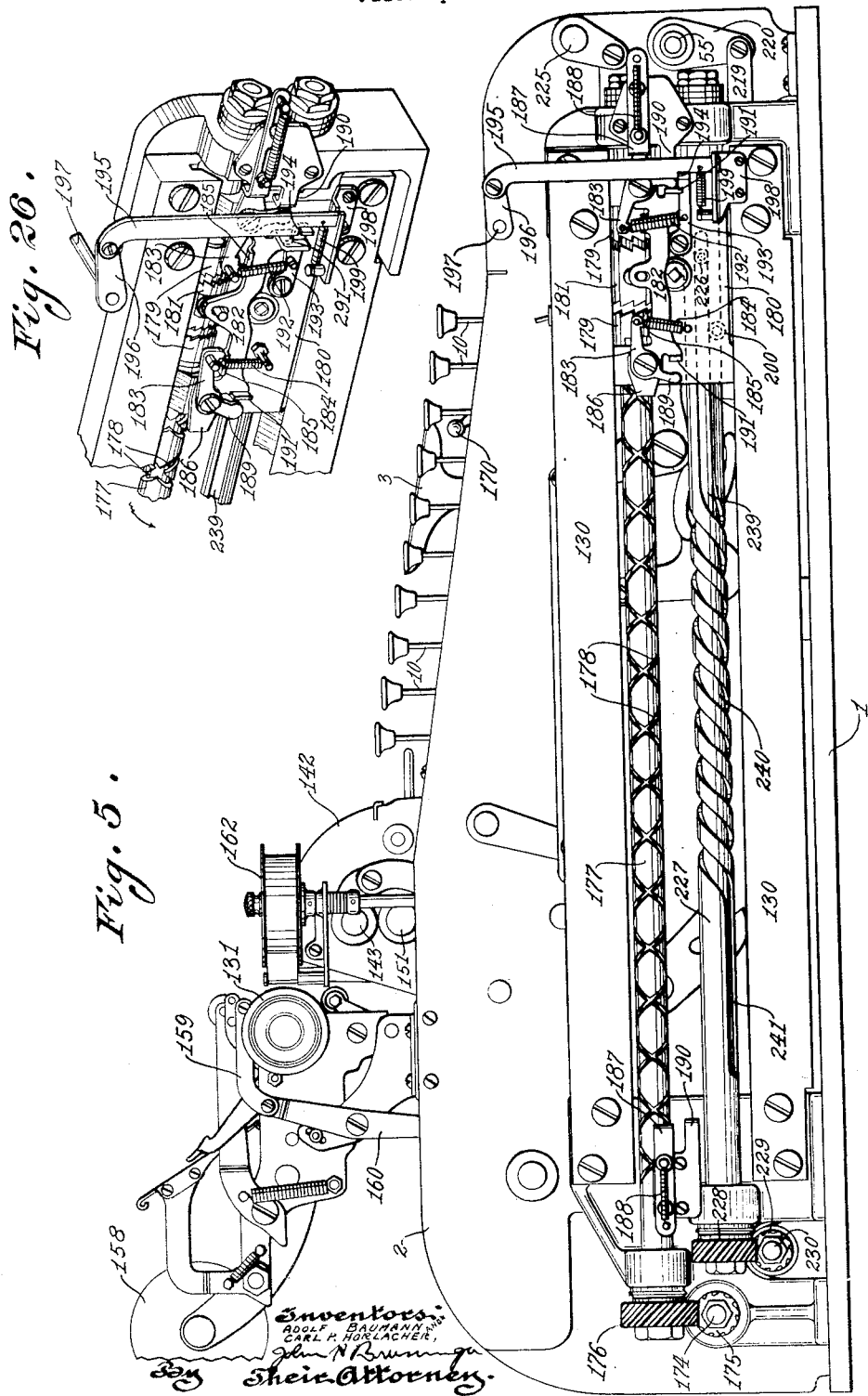

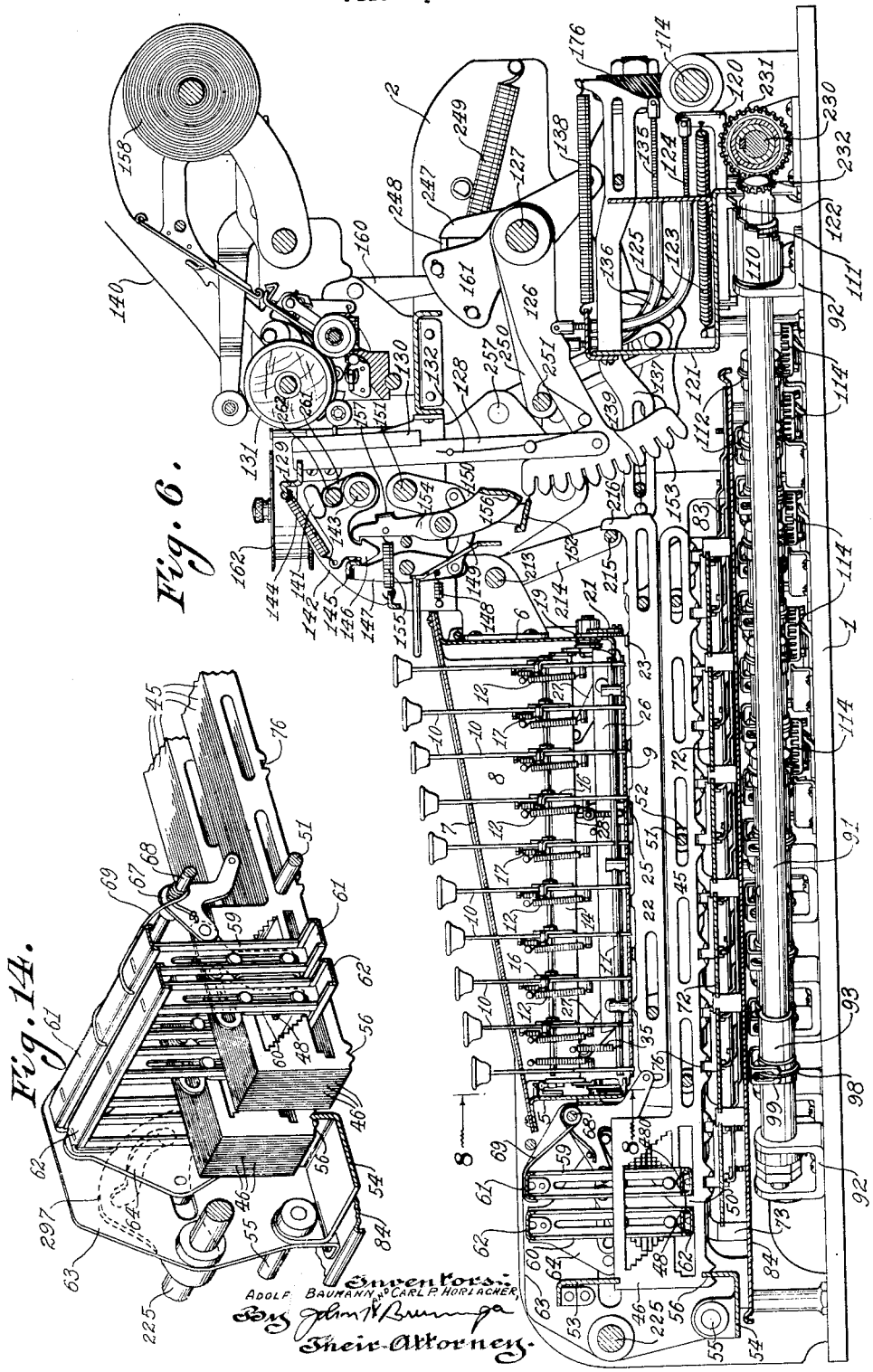

Nov. 1, 1932.  A. BAUMANN ET AL  1,886,148
CALCULATING MACHINE
Filed April 11, 1927    19 Sheets-Sheet 7
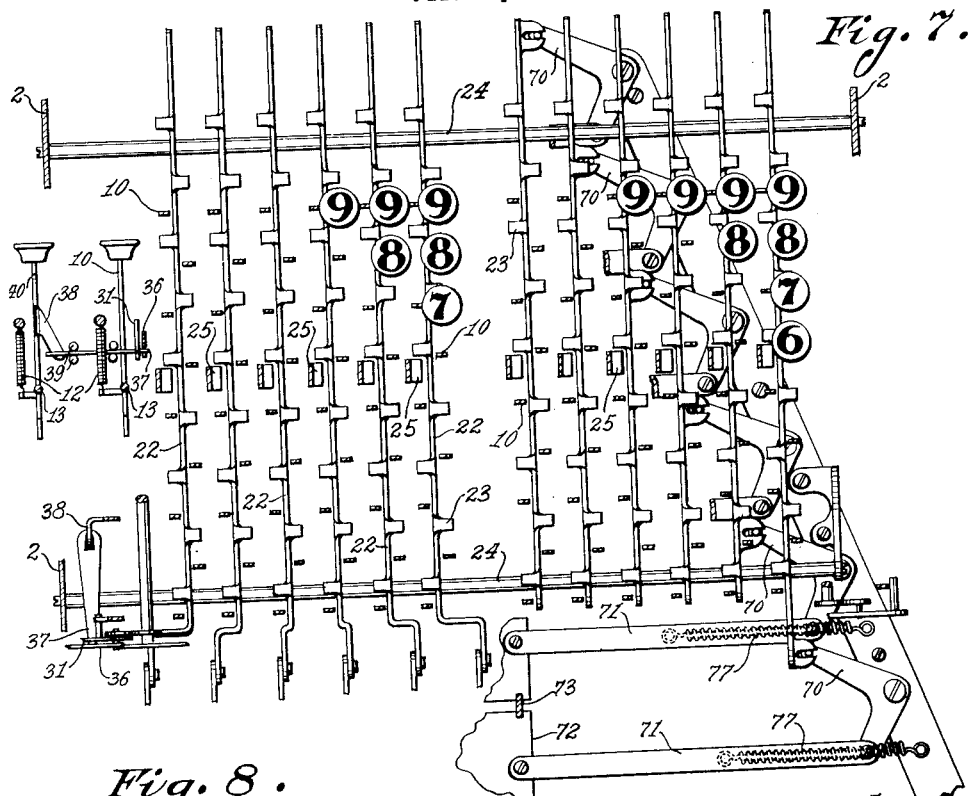
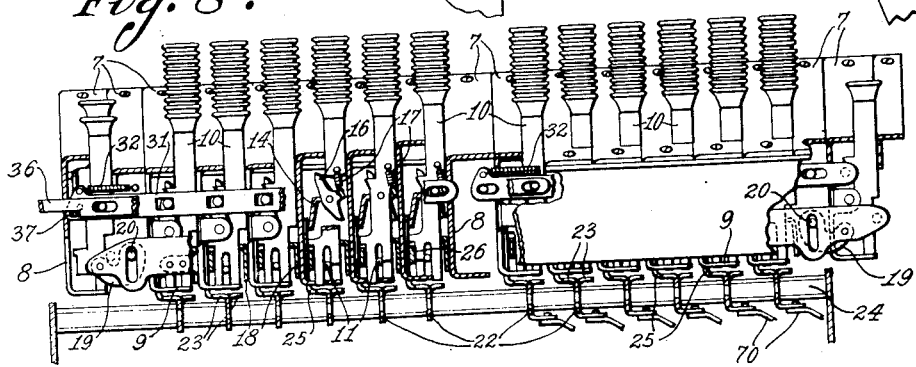
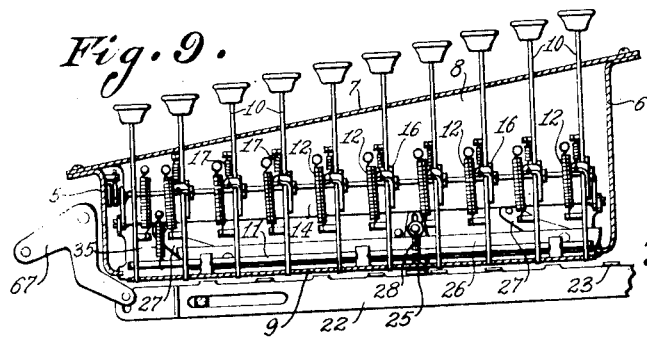

Nov. 1, 1932. A. BAUMANN ET AL 1,886,148
CALCULATING MACHINE
Filed April 11, 1927 19 Sheets-Sheet 8

Inventors:
Adolf Baumann and Carl P. Horlacher,
By John H. Bruninga
Their Attorney.

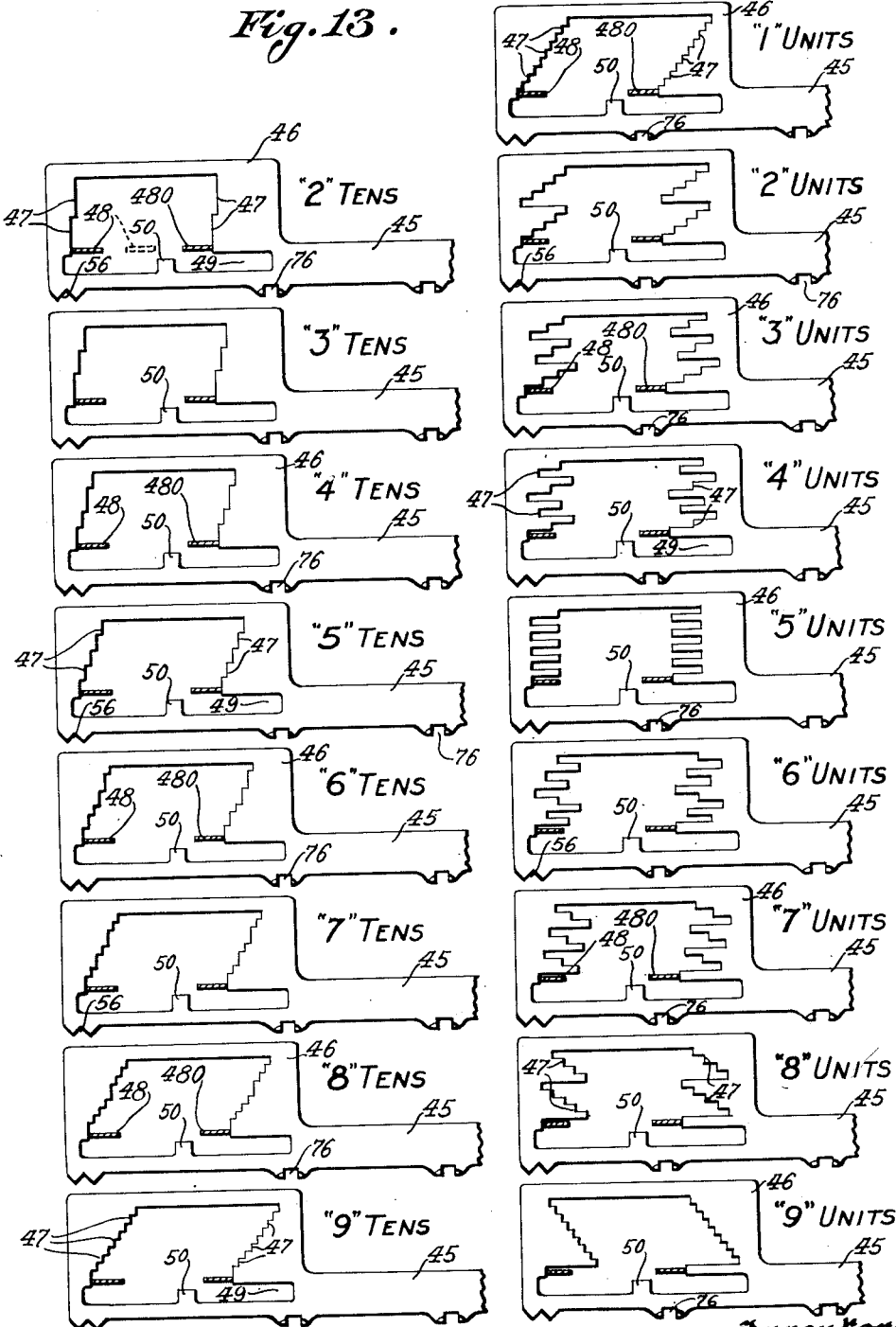

Nov. 1, 1932.  A. BAUMANN ET AL  1,886,148
CALCULATING MACHINE
Filed April 11, 1927  19 Sheets-Sheet 10
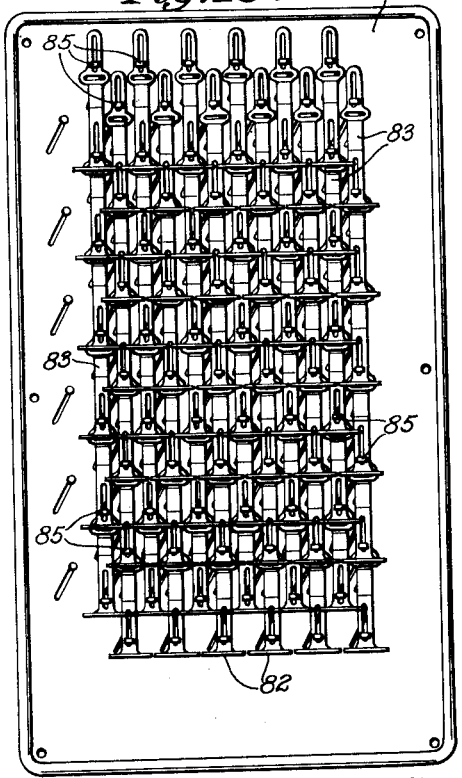
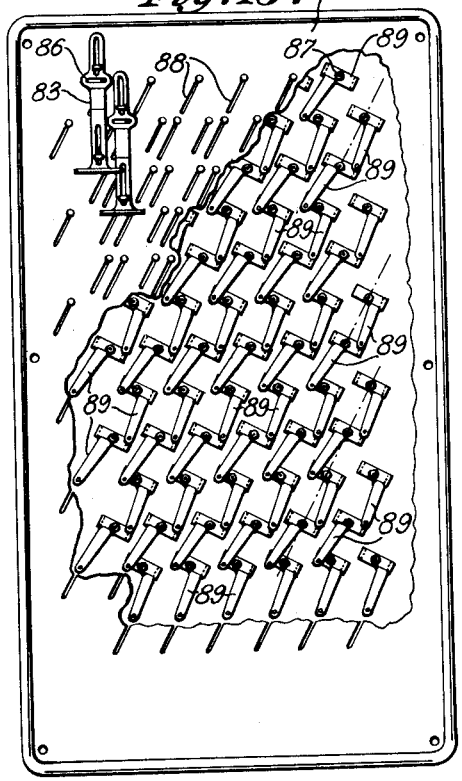
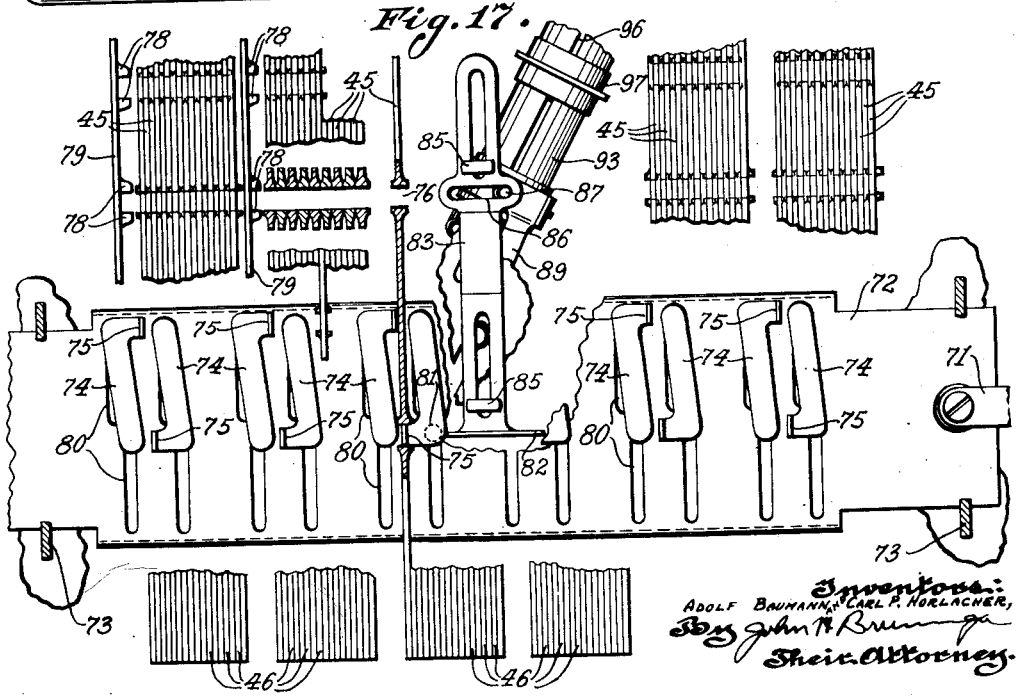

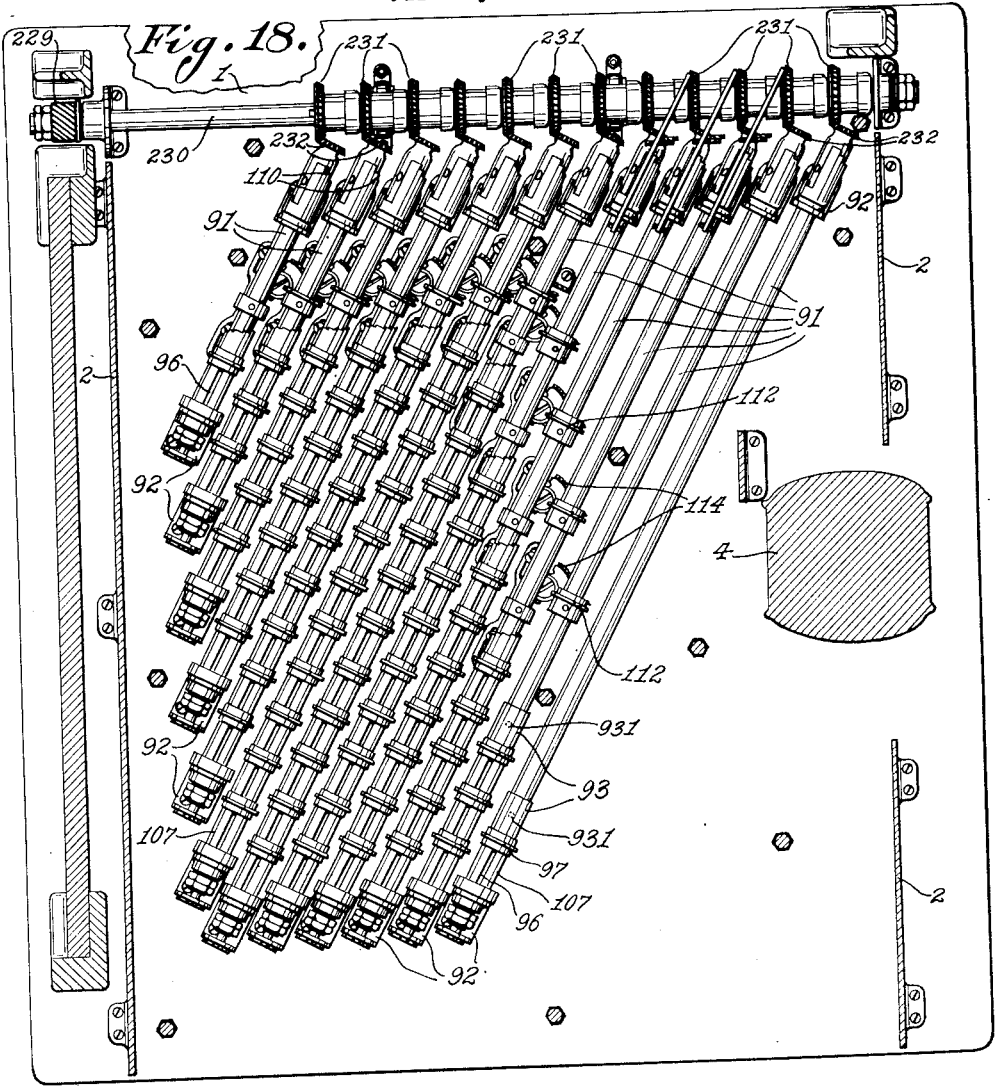

Nov. 1, 1932.  A. BAUMANN ET AL  1,886,148
CALCULATING MACHINE
Filed April 11, 1927   19 Sheets-Sheet 12
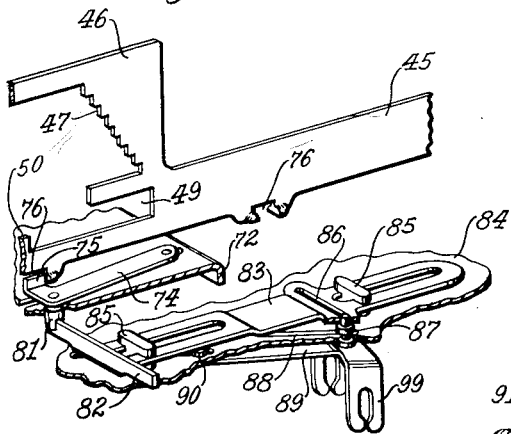
Fig. 19.
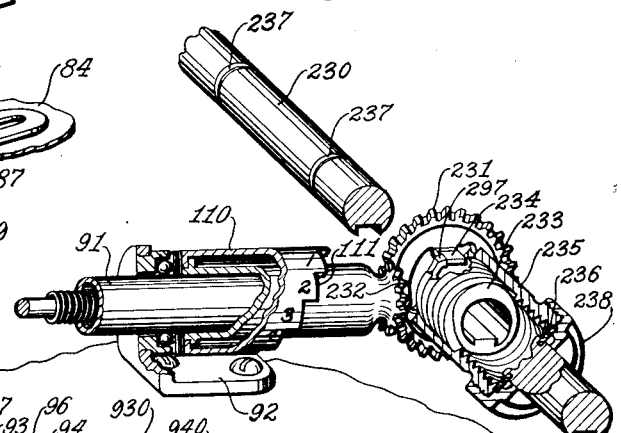
Fig. 20.
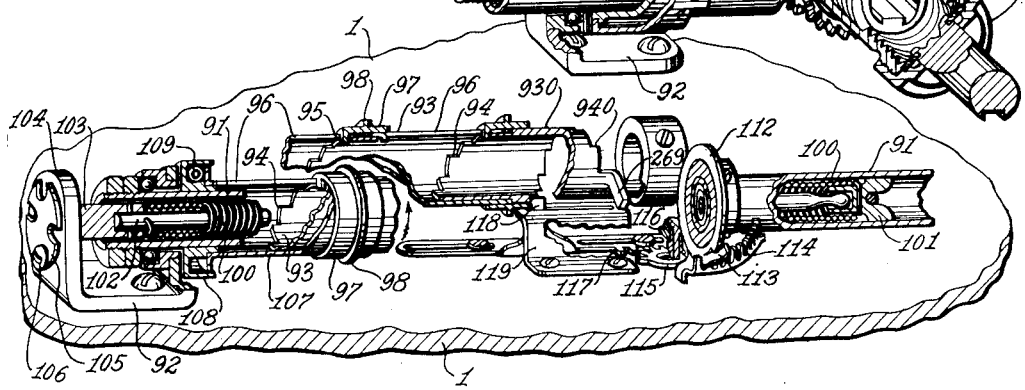
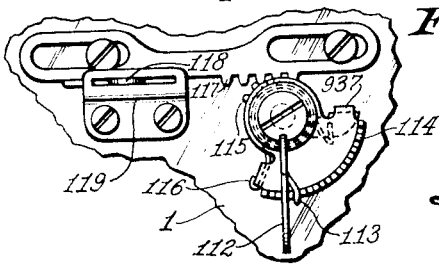
Fig. 22.
Inventors:
Adolf Baumann, Carl P. Horlacher,
By John H. Bruninga
Their Attorney.

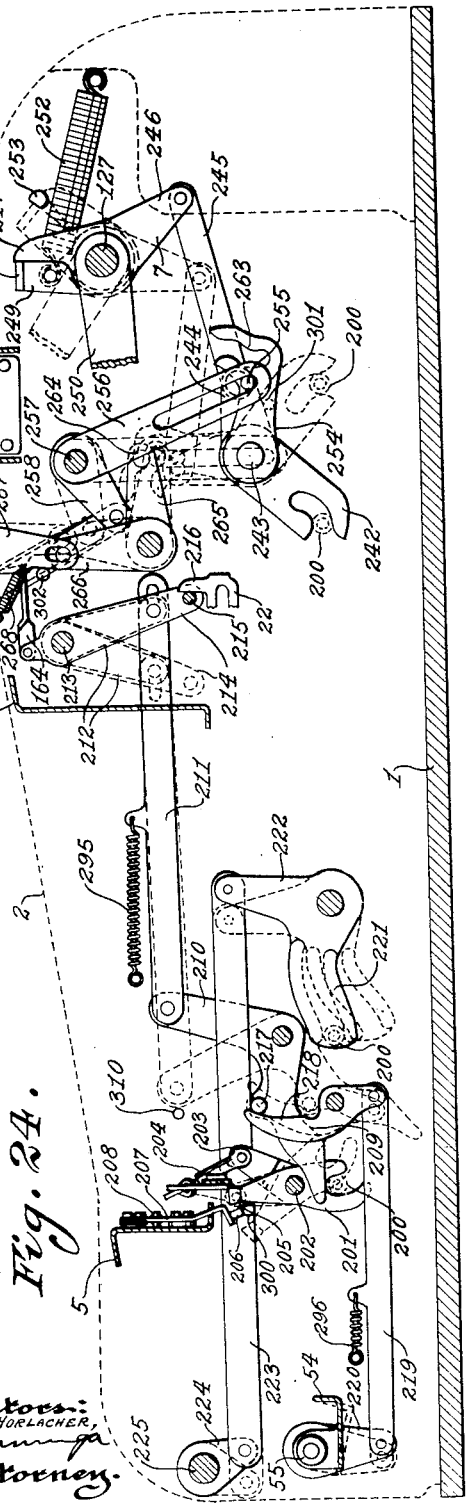
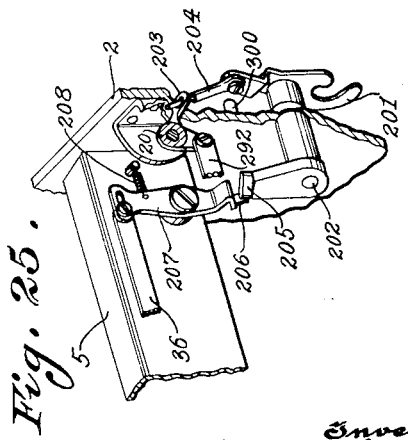
Fig. 24.
Fig. 25.

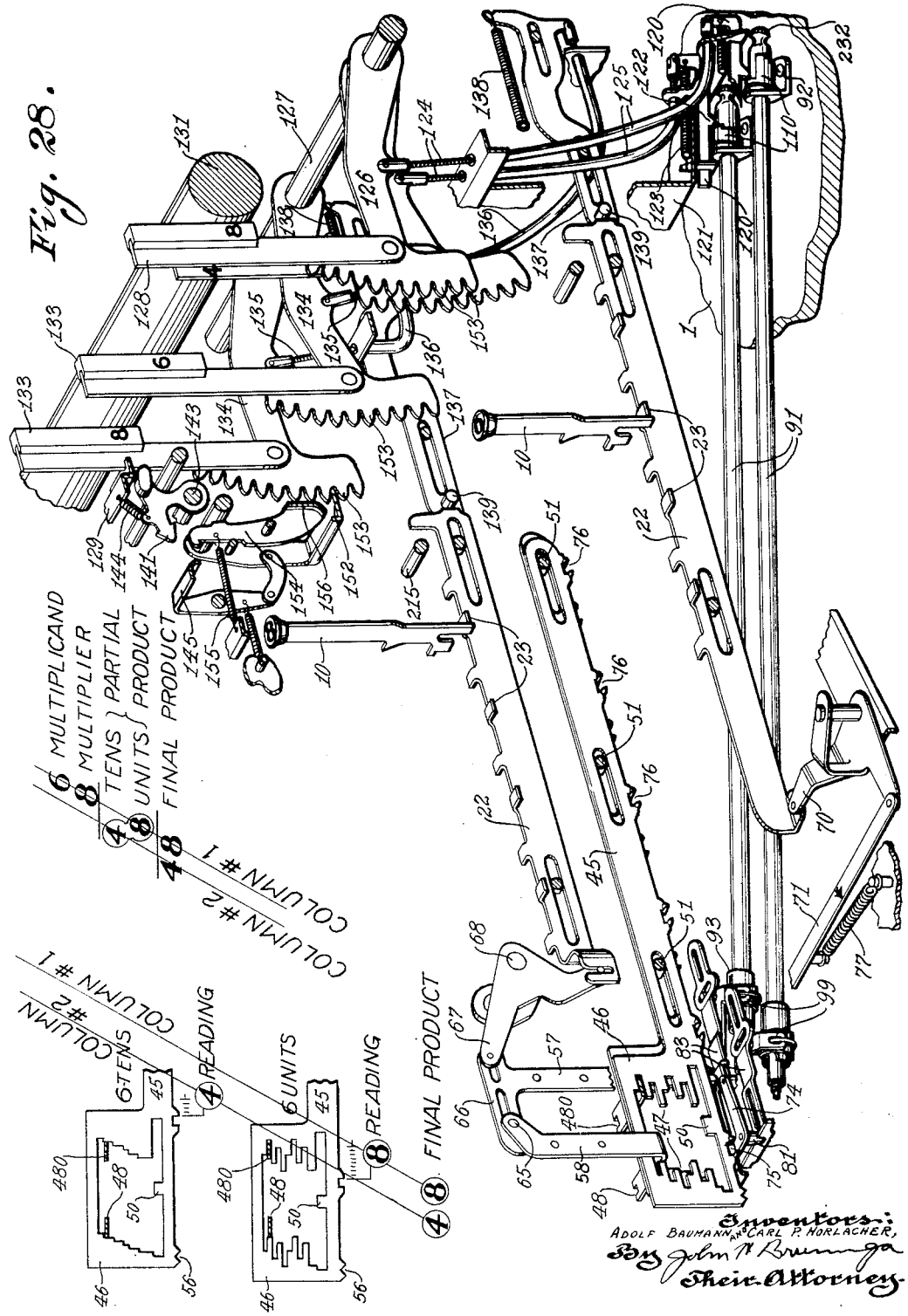

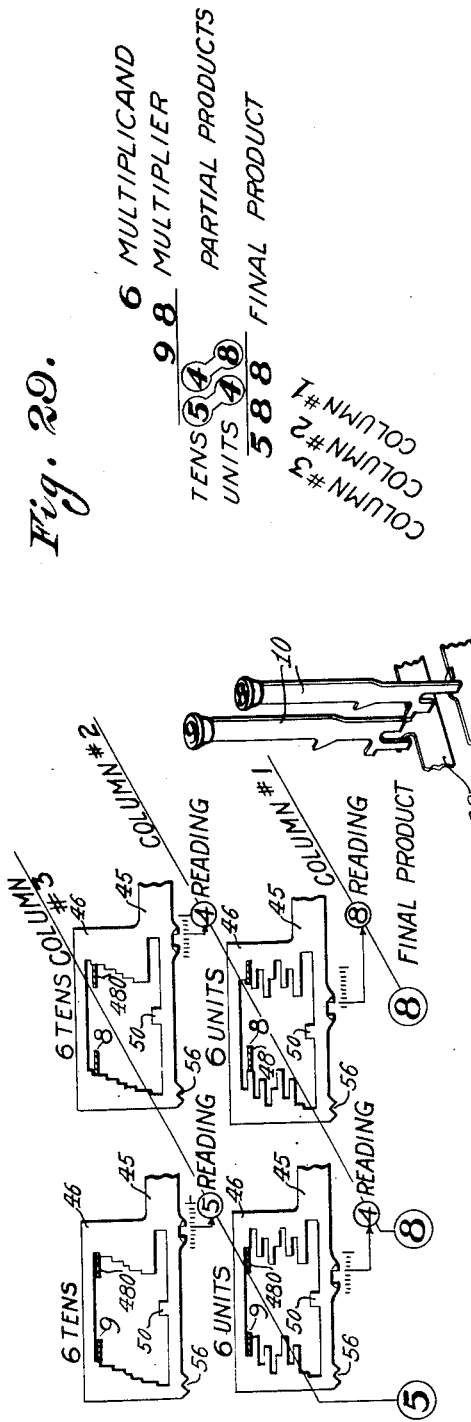
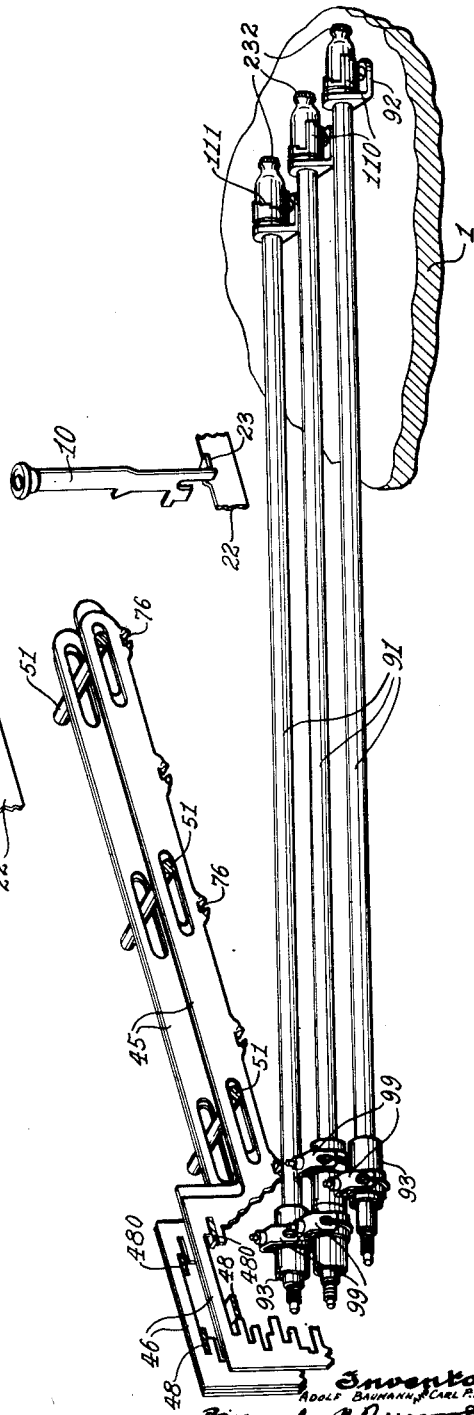

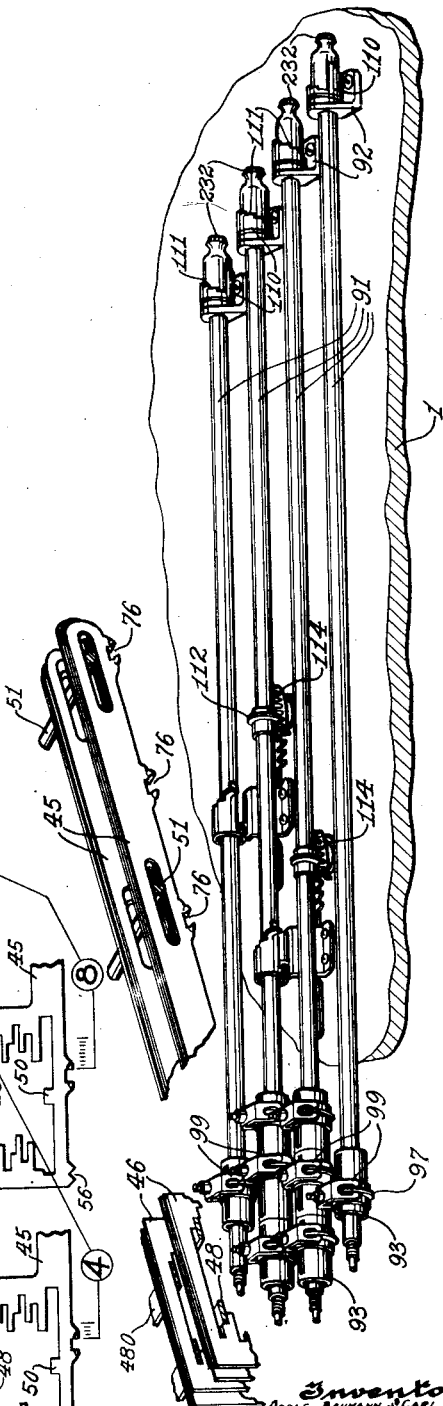

Nov. 1, 1932.  A. BAUMANN ET AL  1,886,148
CALCULATING MACHINE
Filed April 11, 1927  19 Sheets-Sheet 17

Nov. 1, 1932.  A. BAUMANN ET AL  1,886,148
CALCULATING MACHINE
Filed April 11, 1927   19 Sheets-Sheet 19

Patented Nov. 1, 1932

1,886,148

UNITED STATES PATENT OFFICE

ADOLF BAUMANN AND CARL P. HORLACHER, OF ST. LOUIS, MISSOURI, ASSIGNORS, BY MESNE ASSIGNMENTS, TO THE AMERICAN EXCHANGE NATIONAL BANK OF ST. LOUIS, A BANKING CORPORATION

CALCULATING MACHINE

Application filed April 11, 1927. Serial No. 182,766.

This invention relates to calculating machines and more particularly to machines adapted to perform the operations of multiplication.

One of the objects of this invention is to provide a machine in which the calculating operations are carried out in such a manner that the partial products are segregated and accumulated in order to indicate or record the final product.

Another object is to provide a machine in which the operations are performed in a simple and effective manner and by positive, simple and efficient mechanism.

Another object is to provide a machine in which the various resulting partial products corresponding to the multiplier are set up and those partial products selected which correspond to the multiplicand, these selected partial products being then segregated and accumulated in order to set up the final product.

Another object is to provide a multiplying machine in which the multiplier is selectively retained in the machine, after the machine is cleared, in order to repeat the multiplier for various multiplicands.

Another object is to provide a multiplying machine in which the key setting may be selectively cleared, either partially or collectively.

Another object is to improve the machine as to details in order to improve its operation and simplify its construction.

Further objects will appear from the detail description taken in connection with the accompanying drawings in which:

Figure 1 is a plan of a calculating machine embodying this invention;

Figure 2 is a front elevation;

Figure 3 is a rear elevation;

Figure 4 is a right elevation;

Figure 5 is a left elevation;

Figure 6 is a section on line 6—6 of Figure 1, with the lower part taken along one of the receiver shafts;

Figure 7 is a detail showing the key-operated bars and showing also the key shanks in section;

Figure 8 is a section on the line 8—8 of Figure 6, with the multiplier bank parts shown in elevation;

Figure 9 is a detail of Figure 6;

Figure 13 is a view showing the different elements of devices for setting up the partial products;

Figure 14 is a detail of Figure 6, showing two sets of elements and the setting means therefor;

Figure 15 is a plan showing a series of connections operated by those devices;

Figure 16 is a similar view showing the connections from Figure 15 to the receivers;

Figure 17 is a detail showing the complete line of connections from the devices in Figure 13 to the receiving elements;

Figure 18 is a plan showing the receiving elements and also the carrying elements;

Figure 19 is a detail perspective view further illustrating connections shown in Figure 17;

Figure 20 is a perspective view partly in section, illustrating receiving elements, a carrying element and also an accumulating element;

Figure 21 and Figure 22 are details of Figure 20;

Figure 23 is a section through the second series of receivers, from the right, Figure 18;

Figure 24 is a side elevation, partly in section, showing the actuating and clearing mechanism;

Figure 25 is a perspective view showing the key board clearing and locking device;

Figure 26 is a detail perspective showing the clutch;

Figure 27 is a view of a record strip;

Figure 28 is a detail perspective view, somewhat diagrammatical in form, showing mechanism to obtain and print the product resulting from the multiplication of a single digit multiplier by a single digit multiplicand;

Figure 29 is a similar view, but showing mechanism sufficient to obtain the product resulting from the multiplication of a single digit multiplicand by a two digit multiplier;

Figure 30 is a similar view, showing mechanism sufficient for obtaining the product resulting from the multiplication of a two digit multiplicand by a two digit multiplier;

General description

Figure 10:
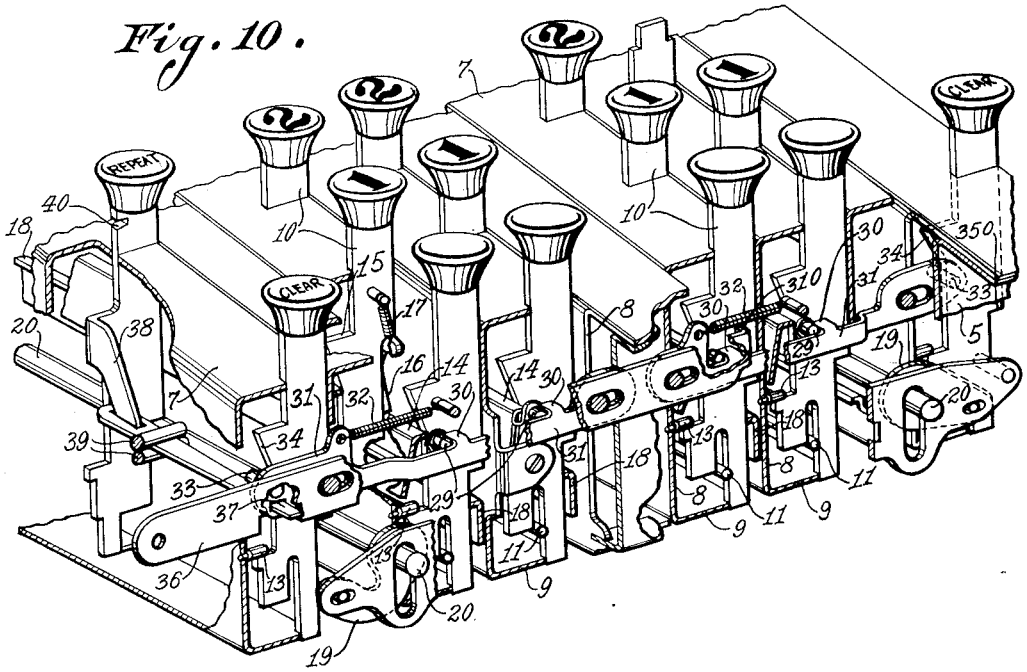
Figure 10 is a perspective view of a part of the key board showing also the connections to the clear and repeat keys; for convenience a two by two bank is shown.

The machine comprises, generally stated, a number of mechanisms and their coordinating connections as follows:

Selective manipulative mechanism;
Partial products setting-up devices;
Segregating mechanism;
Integrating or accumulating mechanism;
Registering or recording mechanism;
Actuating and setting mechanism; and
Resetting or clearing mechanism.

The selective manipulative mechanism in the particular embodiment illustrated, is in the form of a key board consisting of two sections, namely, a multiplier section and a multiplicand section, and each section embodies a series of banks of keys corresponding to the digits of a decimal system. Accordingly, there can be set up on the key board a multi-digit multiplier and a multi-digit multiplicand. By manipulation of the keys, suitably connected mechanism is operated in order to control the partial products setting-up devices, as hereinafter described.

In accordance with this invention means are provided controlled by the multiplier means for setting up the partial products resulting from the multiplication of the various digits by the multiplier; while means controlled by the multiplicand means are arranged to select from the various resulting partial products those corresponding to the multiplicand.

In the particular embodiment illustrated, elements are arranged in groups corresponding to the orders of the multiplier, that is the banks of multiplier keys. Each group has the elements thereof arranged in a series corresponding to the digits of the system. These elements are arranged in pairs and each pair is formed or stepped in accordance with the partial products resulting from the multiplication of the digit represented by that pair by the multiplier set up. Cooperating with each group is a tappet, positioned in accordance with the digits of the multiplier; this tappet is arranged to set all of the elements of a group so as to set up all the partial products resulting from the multiplication of the various digits by the multiplier so set up. Couplers are also arranged in groups corresponding to the orders of the multiplicand, and each group has coupling means consisting in the particular embodiment illustrated, of a pair of couplers for each group of elements. Each coupler pair is arranged to be coupled selectively with a pair of elements, and these couplers are shifted in accordance with the digit settings of the multiplicand so as to select the partial products corresponding to the multiplicands set up.

The integrating or accumulating mechanism comprises a series of receivers arranged in banks in accordance with the orders of the final product, and these receivers are arranged to be set in accordance with the partial products. In the particular embodiment illustrated the couplers are arranged to selectively connect the proper elements with the proper receivers in order that the several partial products will be set into the appropriate receivers of the same orders. Accordingly the partial products will be segregated so as to separately assemble partial products of the same order in the same group or bank in order that the settings of the several groups or banks of receivers may be accumulated.

The accumulating or integrating mechanism is arranged to accumulate the settings of the several receiver banks or assemble and set them into the registers or recorders for the final product. In order to accomplish this, mechanism is provided for integrating the settings in each of the several receiver banks, while the excess accumulated setting of one bank is transferred or set into the next higher bank; for this purpose carrying receivers are provided.

The registering or recording mechanism comprises indicating or printing means which are arranged to be set by the receiving elements in order to indicate or print the final product. In addition to indicating or printing means for the final product, means are provided for indicating or printing the multiplier and the multiplicand. These several indicating or printing means are, however, so coordinated as to be inter-dependent so as to insure the indication or printing of the product corresponding to the indication of the multiplier and the multiplicand. Accordingly, means is provided operating upon setting of the multiplier and the multiplicand setting-up devices, to not only indicate the multiplier and the multiplicand, but also the corresponding product, and the connections are maintained while the product is being taken.

Mechanism is also provided whereby the particular multiplier set up in the multiplier key board may be repeated for different settings of the multiplicand without clearing the machine. Mechanism is also provided for not only clearing the setting of each key board but for also clearing the setting of any bank of keys.

Suitable mechanism is, of course, provided for effecting the coordination of the several mechanisms and for securing operation of the printing mechanism as well as for securing clearing of the machine.

Preliminary description

Referring to Figures 1–6, the machine, generally stated, comprises, a base 1 on which are mounted the side plates 2. On these side plates and therebetween and on this base is mounted the mechanism for securing the result, and suitable supports are provided for the various mechanisms as will hereinafter be more fully described. In the actual machine there will be provided a cover as usual in machines of this type, but this cover has been omitted in order to expose the working mechanism.

In the accompanying drawings and the detail description applying thereto, there is specifically shown and described in detail a machine for obtaining the product resulting from the multiplication of a six digit multiplier and a six digit multiplicand; it will, however, be understood that this embodiment is simply illustrative, for by the addition of proper units, the capacity of the machine may be increased to any desired extent and to any desired number of digits in both the multiplier and the multiplicand.

Selective manipulative mechanism

Referring to Figures 1, 2, 6, 7–12, and first more particularly to Figure 1, it will be noted that the machine has two boards of keys, the ones on the left being in this embodiment the multiplier keys while the ones on the right are the multiplicand keys. In each board the keys are arranged in banks numbered from "1" to "9" inclusive, corresponding to the nine digits of the numerical system, the "0" digit key being omitted since it is unnecessary.

There is also in each bank in front of the "1" key, a key whose function it is to clear the setting in its particular bank. To the left of the multiplier section and to the right of the multiplicand section, is a key marked "clear" whose function it is to clear the setting of its particular section. To the left of the multiplier section is a key marked "repeat" whose function it is to maintain the setting of the multiplier section and permit it to be repeated. To the right of the multi- plicand section is a trip bar 3 whose function it is to start the mechanism in operation, which mechanism is in this case operated by a motor 4.

Referring now particularly to Figures 6–11, connecting the plates 2 are cross pieces 5 and 6, which provide supports for the banks of keys. Each key bank is a structure preferably formed of sheet metal, having a top 7, a vertical part 8 and a bottom part 9, forming as a whole a channel structure as shown particularly in Figure 10. The ends of the top 7 project as shown in Figure 9 to rest on the cross pieces 5 and 6, being attached thereto by screws to permit removal of the entire bank as a whole. The top and bottom are slotted to receive the key shanks 10, which are retained in position, as shown in Figure 10, at the bottom by a guide 11 supported by the bottom 9 and at the top by the part 8 in the next bank.

The keys are held in raised position by springs 12 against stops 13, Figures 9 and 10. A latch 14 extending along the keys and pivoted below is arranged to take over cam shoulders 15 on the key shanks so as to hold any key in depressed position; the cam of another key will, however, bear against the latch so as to shift it against the tension of its spring 35, Figures 6 and 9, so as to free the previously depressed key.

Figure 11:
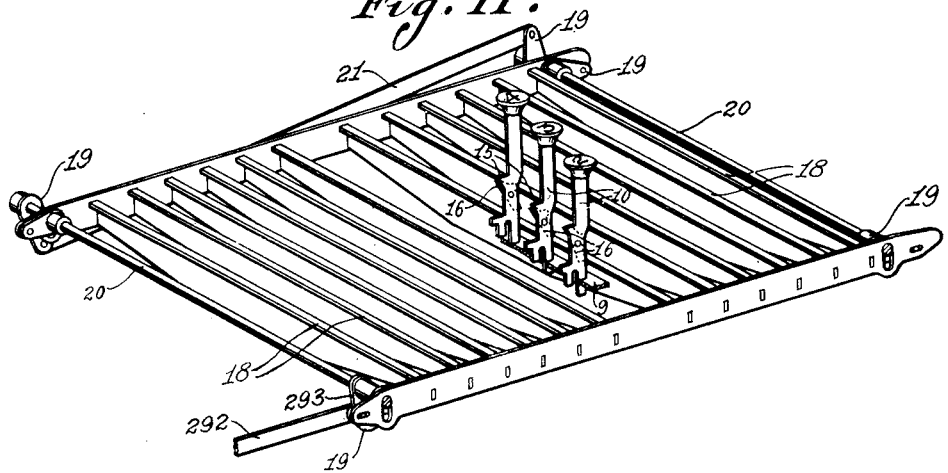
Figure 11 is a perspective view showing mechanism for returning keys which have not been fully depressed.
Figure 12:
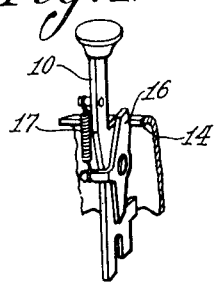
Figure 12 is an enlarged detail perspective view of Figure 11.
Figure 31:
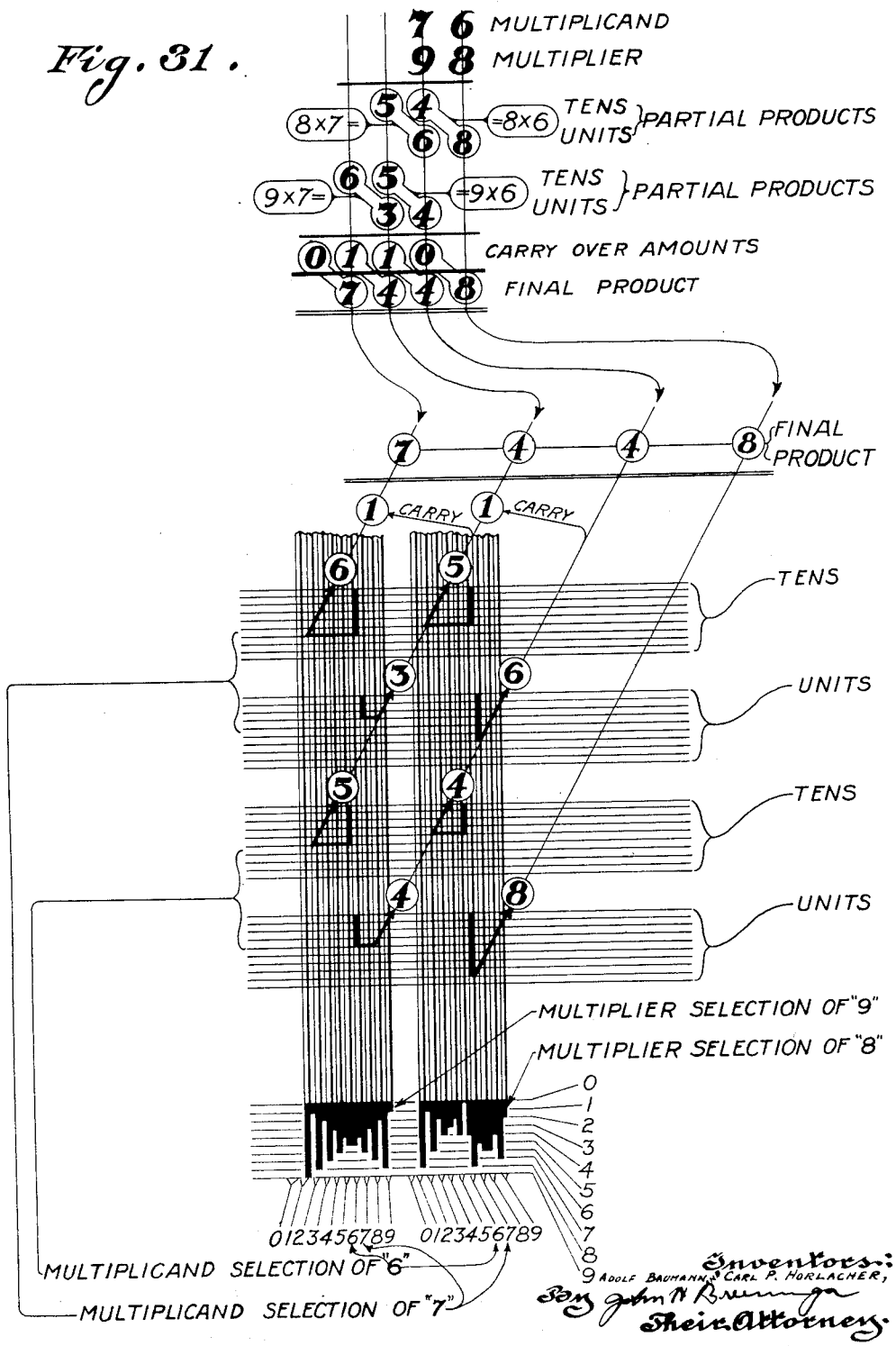
Figure 31 is a diagrammatical view, showing the arrangement of parts in Figure 30.
Figure 32:
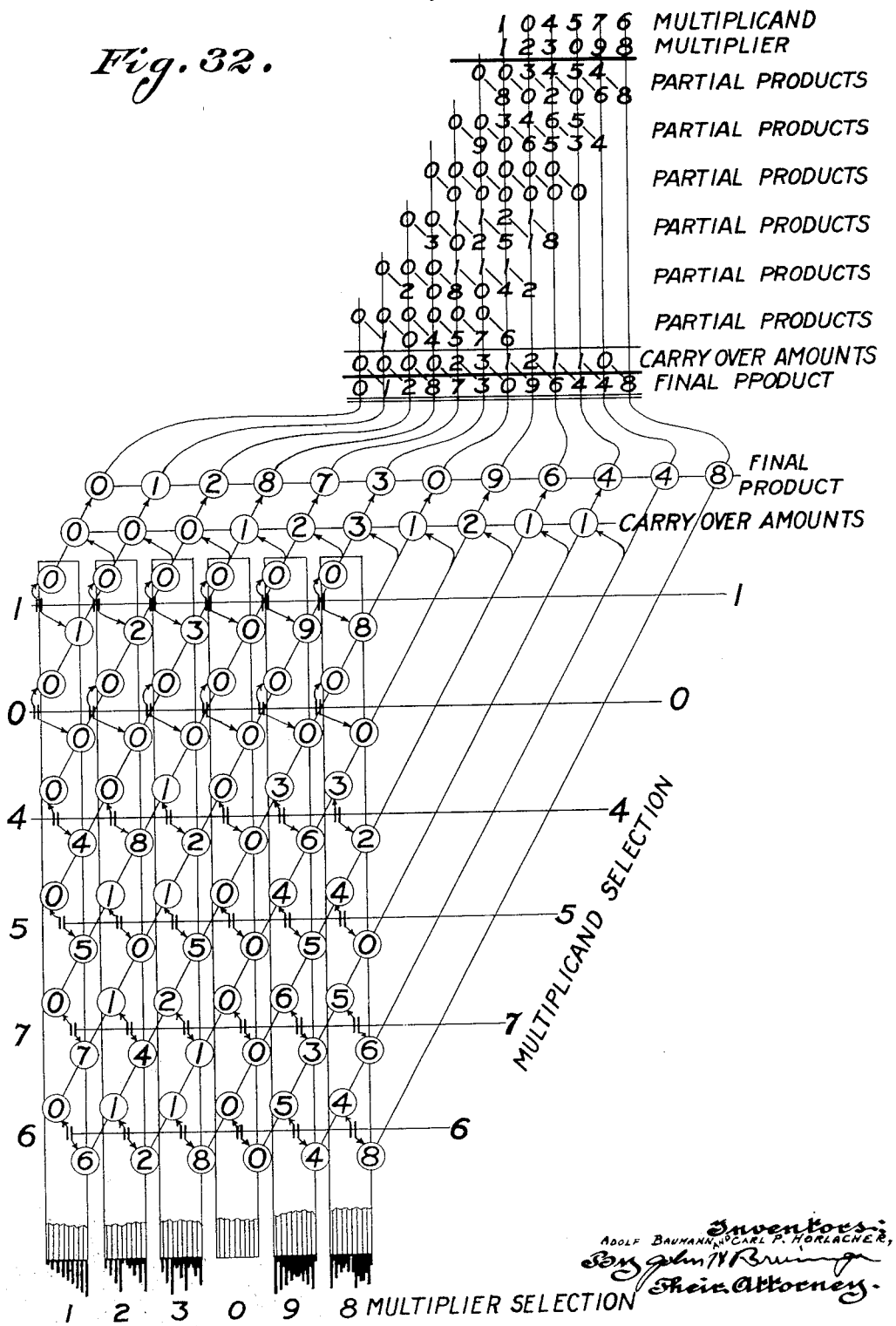
Figure 32 is a diagrammatic view, showing the arrangement of parts sufficient to obtain the product resulting from the multiplication of a six digit multiplicand by a six digit multiplier.
Figure 33:
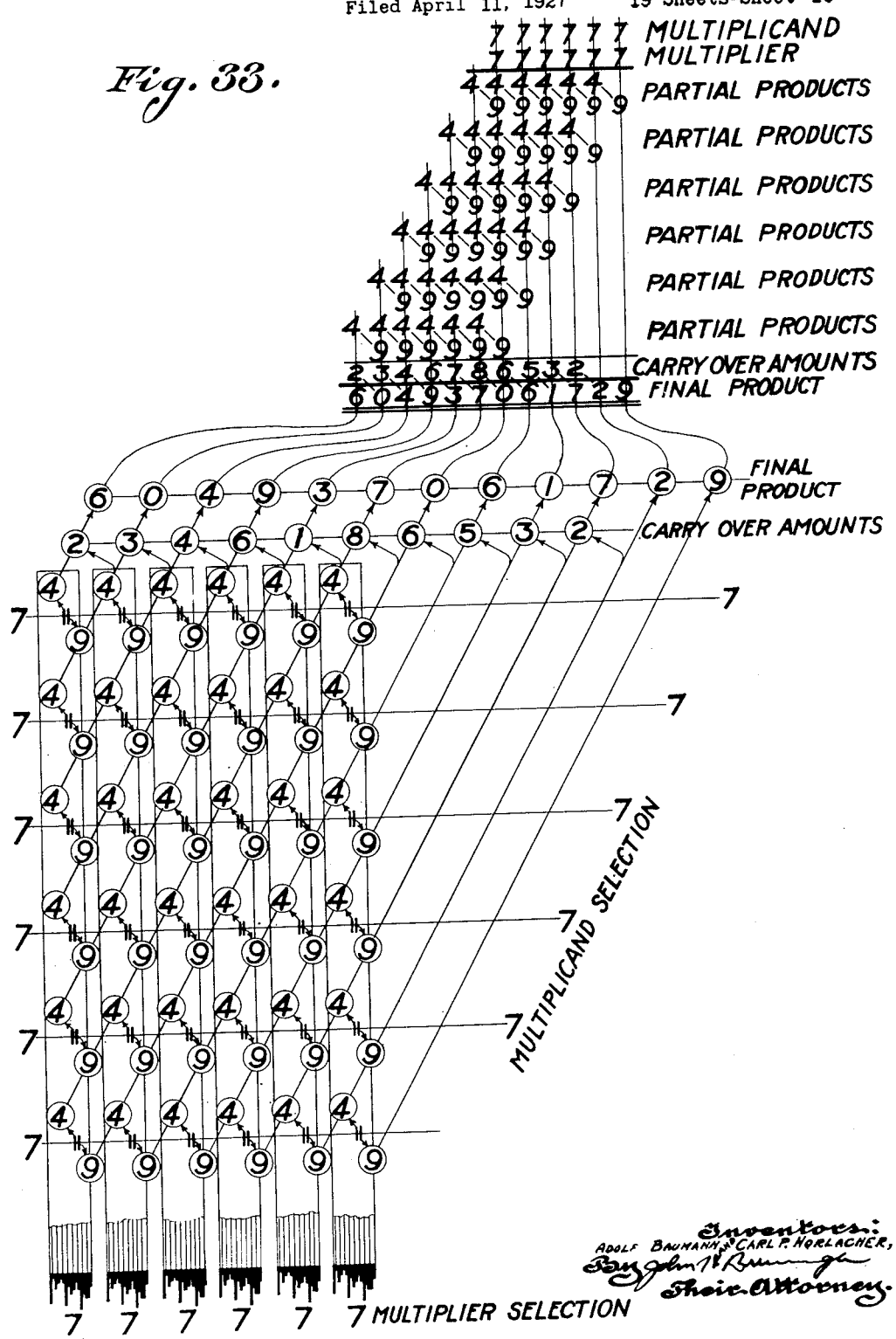
Figure 33 is a similar view showing a different multiplicand and a different multiplier.

Pivoted on each key shank intermediate its ends, Figures 10, 11 and 12; is a finger 16 which is normally held by a spring 17 with its lower end projecting beyond the shank. When, however, any key is depressed, the upper end of this finger will bear against the latch 14 and move the lower end within the margin of the shank. A frame comprising bars 18 extending along each key bank, is guided for vertical movement by the shafts 20 and by the cross pieces 5 and 6. When this frame is raised it will strike against the projecting finger 16 on any partly depressed key so as to again raise this key; if, however, the key has been fully depressed then the finger 16 will not project beyond the key shank as previously explained, so that the frame will not be active on such a key; this, therefore, provides means whereby any key which has not been fully depressed will be raised to normal position; while all keys which have not been depressed will be locked in raised position against depression. The frame is raised by arms 19 fixed on shafts 20 interconnected by a link 21 and operated in a manner hereinafter to be described when the trip bar 3 is depressed.

Arranged below each bank of keys, Figures 7–9 is a stop bar 22 which has lugs 23 thereon. The stop bars are guided by grooved shafts 24 mounted on the plates 2 as usual in calculating machines. These bars are slid lengthwise and are arrested by such key shanks as may be depressed, as usual. A stop 25 is mounted for vertical movement on part 8 and is normally arranged in the path of one of these lugs 23 so as to hold the bar 22 in zero position; this stop is, however, connected with a parallel bar 26, Figure 9, carried by links 27 on 8 and normally held in raised position by a spring 28. The bar 26 is arranged to be struck by any depressed key so as to depress it in order to cause the stop 25 to move below the lugs 23 and permit free movement of the bar 22 in that key bank.

It has been shown that upon depression of any key, a previously depressed key in that bank will be released and permitted to rise; this result can also be attained when the first or unnumbered key in any bank is depressed; there is thus provided means whereby the setting in any bank may be cleared. Each latch 14, however, has a pin 29 in the path of a lug 30 on a bar 31 (one for the multiplier section and one for the multiplicand section) guided for movement as shown in Figure 10, and normally retained in inactive position by a spring 32. Each of these bars 31 extends to a "clear" key and has a pin 33 arranged to be engaged by a cam 34 on that key. Accordingly, upon depression of a "clear" key all of the latches 14 for that section will be swung on their pivots against the tensions of their springs 35 in order to free the keys in that section.

The clearing bars 31 for the multiplier and multiplicand sections are arranged to be actuated by a link 36 when the machine is finally cleared as hereinafter described. The connection from 36 to the multiplicand section bar 31 is made by a lug 310 on 36 taking behind one of the lugs 30 on 31. The connection between the multiplier section bar 31 and 36 is, however, made through a coupling 37 passing through a guide on 31 and a slot in 36, which slot is sufficiently long to permit independent movement of the bar 31 by its "clear" key. The shank of a "repeat" key, Figure 10, however, has a cam 38 working in a slot in the coupling 37, the connection being sufficiently loose and the coupling being guided between spaced pins 39 on 8 so that the multiplier section bar 31 may slide back and forth. When the "repeat" key is in raised position the coupling 37 projects into the slot in 36 and at this time the multiplier section bar 31 will be actuated by 36; when, however, the "repeat" key is depressed the coupling will be withdrawn from 36 so that 31 will not be actuated upon actuation of 36. The "repeat" key may be maintained in depressed position by a notch 40 arranged to take into the edge of the top 7 when the "repeat" key is swung sidewise. Accordingly as long as the "repeat" key is held depressed the setting will be maintained in the multiplier section. The repeat as well as the clear keys are normally held in raised position by springs 12. Each of the clear keys is also provided with a shoulder 350 in the path of shafts 20 and bars 18; accordingly, when the frame, Figure 11, is raised, none of the clear keys can be depressed.

Partial products setting up devices

Referring now to Figures 1, 2, 6, 13 and 14, the devices for setting up the partial products comprise a series of groups of elements corresponding to the number of orders of the multiplier. The elements of the several groups, however, correspond so that a detail description of one group will apply to the others.

Upon reference to Figure 13 it will be seen that a group comprises 17 elements arranged in 9 pairs corresponding to 9 digits of a numerical system, the zero or tenth element being unnecessary in the decimal system. It will be understood, of course, that this machine is adapted to other than decimal systems, as for instance, the British monetary system. The elements are arranged in pairs each comprising a tens and a unit element, a "1" tens element is, however, unnecessary, and has, therefore, been omitted. In arranging these elements in a group the "1" units will be followed by a "2" tens, then by a "2" units, then by a "3" tens, etc.

Each element comprises a bar 45 having an enlargement or a head 46 provided with steps 47; these steps are in duplicate in order to cooperate with a tappet 48 and a stop 480. Below the steps 47 is a slot 49 having a stop 50 projecting therein. The bars 45 are slotted as shown in Figure 6, to receive cross bars 51 mounted in brackets on the base in order to guide these bars during their movements, lateral movement of assembled groups being prevented by collars 52, Figure 6, as usual in calculating machine constructions. The heads 46 are also guided by a cross bar 53 mounted in the plates 63 and notched to embrace the outside elements of a group. The bars 45 are aligned by a cross bar 54 pivoted at 55 and arranged to enter notches 56 in the bars 45; this cross bar 54 is moved up by mechanism hereafter described in order to align the bars 45. The cross bar 54 is notched as is the bar 53 to embrace the outside elements of a group in order to also guide the bars 45.

Upon reference to Figure 13, it will be noted that each pair of elements represents a digit of a multiplicand. In the units elements there are ten shoulders or steps (in duplicate), corresponding to the ten digits of the numerical system; the tens elements also really have ten steps although some of these steps are merged. This arrangement of steps is generally well known in the art of calculating machines and detail description is therefore unnecessary; it is only necessary to point out that the steps 47 will correspond to the partial products resulting from the multiplication of any selected multiplicand by any selected multiplier; thus by reference to the multiplier elements 8 it will be seen that the steps 47 in the "6" position correspond respectively to 4 and 8, which represent the partial products resulting from the multiplication of 6 by 8. The number of groups correspond to the number of orders of the multiplier as will be seen from Figure 1.

In the normal position of parts the tappets 48, Figures 6 and 13, will be in dotted position, Figure 13, while the bars 45 will be in the position shown in Figures 6, 14 and 13, where they are aligned by the cross bar 54; both the tappet 48 and the stop 480 will also be vertically in the position shown which is the lowest or "zero" position. At this position 48 and 480 are really spaced slightly from 47 to provide clearance and free movement of 48 and 480 vertically as hereinafter described. 48 and 480 extend from vertical shanks 58—57, Figures 14 and 28, and are vertically movable in guides 60 and 59 supported by cross pieces 61 and 62 at the top and bottom. The cross pieces 61 are fixed in plates 63 while the cross pieces 62 are mounted in cross heads 64 slidable horizontally on these plates. Each shank 58 is connected to move vertically with the corresponding shank 57 by a pin 65 engaging a slot in a head 66. Each head 66 is connected to one arm of a bell crank lever 67 on a shaft 68 connecting the plates 63 while the other arm has a pin and slot connection with the corresponding multiplier bar 22. The spring 69 serves to tension each bell crank lever so as to elevate the connected tappet 48 and stop 480 when the multiplier bar is released. Yieldingly operated mechanism is provided for sliding the cross heads 64 and their connected cross bars 62 to the left Figures 6 and 14, as hereinafter described.

From the above it will be seen that if, for instance, the "8" multiplier key is depressed so as to project its shank in the path of the corresponding stop 23, then the bar 22 is permitted to move to the "8" position, causing the tappet 48 and the stop 480 to be moved to that position. This takes place while the tappet 48 is at its normal position close to its cooperating stop. If, now the tappet 48 is moved to the left all of the bars 45 in that group will be carried with it until the plates with their "8" steps are arrested by the stationary stop 480. It will also be seen that in all of the other groups in which the stops are at zero position there will be no effective movement of the bars 45 at all.

The positioning of, for instance, the tappet 48 and stop 480 to the "8" position, and the shifting of the bars 45, will cause the pairs of bars to assume positions in accordance with the partial products of 8 as multiplied by 1, 2, 3, 4, 5, 6, 7, 8, 9. It is, therefore, only necessary to provide means for selecting in the groups so shifted a pair of bars 45 corresponding to the multiplicand. For this purpose each multiplicand bar 22 (Figures 28, 17 and 19) is connected by a bell crank lever 70 and a link 71 with a slide 72 guided for movement on a frame 73. There are a series of these slides extending crosswise of the bars 45 and each has pairs of slidable couplers 74, one pair for each group of bars 45. Each of these couplers has a vertical lug 75 arranged to enter a notch 76 in a bar 45; these notches are, however, arranged in pairs, all of the notches in the units bars of a group being in alignment while all of the notches in the tens bars of that group are also in alignment. The notches in the units bars are arranged to align with the lugs 75 of the right couplers 74, Figure 17, while the notches in the tens bars are arranged to align with the lugs of the left couplers 74. It will be noted, however, from Figure 17, that the metal at the notches and below the bars is thickened to provide extended bearing surfaces. The lugs 75 are so spaced that when one lug is in the notch of the units bar the other lug will be in the notch of the tens bar, except when the multiplicand setting is 0 or 1. At the 0 position both the tens and units lugs 75 are aligned with and held by fixed lugs 78 on stationary plates 79, Figure 17; while at the 1 position the tens lugs 75 will be held by lugs 78 and the units lug 75 will be in the notch 76 of the 1 units bar 45. By shifting the slide 72 a pair of couplers 74 can be positioned to cooperate with any desired pair of bars 45. Springs 77, Figure 28, are provided to shift the slides 72 when released, so that these slides will move to positions as determined by the depressed multiplicand keys.

It will now be seen, upon reference to Figure 28, that if, for instance, after depression of the "8" multiplier key, the "6" multiplicand key is depressed, the slide 72 will be shifted by its spring 77 to place the lugs 75 at the "6" position. Accordingly, when the bars 45 are shifted, the couplers 74 will be shifted to positions determined by the "8" tens and units steps. In the example contemplated the tappet 48 and stop 480 have been shifted to the "8" position, and the tens and units couplers 74 will be shifted to the "4" and "8" positions respectively. Upon shifting of the plates 72 it will, of course, be understood that the other couplers 74 will also be shifted to the same positions with respect to the bars 45 of the other groups; however, if the tappet 48 and stop 480 of those other groups are at zero positions, there will be no shift of these couplers. It will also be seen that each of the slides 72 may be independently set to any position corresponding to any desired digit of the multiplicand; these will be hereafter referred to in a more complete example. It will be understood that in the normal or zero positions of the slide 72 the lugs 75 will be so positioned as to be entirely out of alignment with the bars 45 and the notches 76 therein and in mesh with the fixed lugs 78 as heretofore described.

Upon referring to Figure 2 it will be seen that there are six groups of bars 45 corresponding to the six orders of the multiplier. As shown in Figure 6 there are six slides 72 corresponding to the six orders of the multiplicand. From Figure 17 it will also be seen that each slide 72 has six pairs of couplers 74 corresponding to the six groups of bars 45 and the six orders of the multiplier. It has also been shown that when the tappet 48 and stop 480 are at their normal or zero positions, there will be no movement of the bars 45 for that group, even though a set of couplers 74 may be shifted into that group; but that when any slide 72 is at zero position with the elements aligned with the fixed stops 78 then those particular elements on that slide will not be shifted.

With this preliminary description the principle of operation will be readily understood. The depression of any multiplier key will (upon operation of the machine) position the tappet 48 and stop 480 for the group of bars 45 corresponding to the order of that key, so as to set up all of the partial products in that group, which partial products result from the multiplication of the digit (for instance 8) by 1, 2, 3, 4, 5, 6, 7, 8, 9. The same action will take place upon depression of any other multiplier key. Now, upon depression of any multiplicand key, the couplers 74 on the slide connected with that key, (upon operation of the machine) will be set to cooperate with a pair of bars 45 in each group and corresponding to the digit setting of the multiplicand. The result will, therefore, be that the elements will pick out from each group the particular partial products corresponding to the digit setting of the multiplicand, while the other partial products in these groups will be disregarded.

*Segregating mechanism*

Referring to Figures 6, 15–20, 23 and 28, each of the shifting couplers 74 is movable on its slide 72 (Figures 17 and 19) by pins passing through slots 80 therein, which pins are headed over to retain the coupler on the slide. One of these pins has an enlarged head 81 which is slotted to take over a head 82 extending transversely of the machine and formed on a slidable element 83 mounted on a plate 84 and guided thereon by lugs 85. There are a series of these elements 83 arranged as shown in Figure 15, in transverse banks corresponding in number to the orders of the multiplicand, and in longitudinal banks corresponding to the orders of the multiplier. The elements 83 are in pairs with one element of each pair connected to be moved by a units bar 45 and with the other element connected to be moved by a tens bar. The extended bearing of the head 82 permits the couplers 74 to be shifted with the slide 72 while maintaining the operative connection; accordingly the elements 83 of a pair are shifted by a pair of bars 45.

Referring now particularly to Figures 16 and 19, each element 83 has a slot 86 cooperating with a pin 87 projecting through a guide slot 88 in the plate 84, connected to an element 89 provided with another pin 90 projecting through another guide slot 88 in the plate 84. The pin 87 is grooved as shown in Figure 19 so as to maintain the element 89 in position and the slots 88 are arranged at an angle with respect to the movement of the element 83, so there is an element 89 connected to each of the elements 83. These elements 89 are arranged as shown in Figure 16, in pairs and banks like the elements 83, Figure 15. On account of the pin and slot connection with elements 83, these elements 89 can be shifted even though the movement of each is at an angle with respect to the movement of the connected element 83 and the bars 45.

Referring now to Figures 6, 16, 17, 18, 19 and 28, arranged underneath the plate 84 are a series of shafts 91 supported at their ends in bearings 92 on the base 1 and arranged along the lines of movements of the elements 89. Each of these shafts has one or more receivers 93, connected therewith and provided with stops 94 arranged circumferentially and axially to cooperate with an index 95 in the form of a lug projecting through a slot 96 and formed on an encircling collar 97. This collar is provided with a circumferential rib 98 adapted to pass through the forked ends of a stirrup 99 on an element 89. The stops 94 are nine in number (although the stops on tens receiver can be eight). By shifting the collar 97 along a receiver the latter can be turned relatively to the index 95 to various positions corresponding to the particular partial product set up by the shifting of the corresponding bar 45.

Upon comparing Figures 15 and 16 with Figure 18, it will be seen that the shafts 91 have receivers thereon corresponding in number and location to the elements 89 (or 83) located in the lines or banks along the shafts 91. The receivers are, therefore, arranged in banks corresponding with the orders of the various partial products, so that the partial products of the same order will be set in receivers in the same and corresponding bank. There is, therefore, provided mechanism for segregating the partial products. If we take, for instance, the example illustrated in Figure 30, showing the partial products resulting from the multiplication of 76 by 98, it will be seen that the partial products will be set in the several receivers as follows: reading from the right, Figure 18 (or from bottom Figure 30), "8" will be set in the first bank, "4"—"6"—"4" in the second bank, "5"—"5"—

"3" in the third bank, and "6" in the fourth bank.

*Accumulating or integrating mechanism*

The means provided for accumulating the partial products as well as for transferring excess accumulations from one bank to the next higher bank will now be described.

Referring to Figures 6, 18, 20-23, each shaft 91 is hollow to receive a spring 100 fixed thereto at one end by a coupling 101 and encircling a stem 102 extending through the shaft and rotative in the coupling 101. The left end, Figures 20 and 23, of the stem 102, is fixed in a plug 103 passing through an upstanding part 104 on the left bracket 92 and having a head 105 provided with notches arranged to receive a screw 106 threaded into the bracket. This provides means whereby the tension of the spring may be raised by rotative adjustment of the plug, the adjustment being fixed by the screw 106. The shaft has anti-friction bearings in the brackets 92.

The receiver 93 in the first bank and the right receiver in the second bank (Figure 18) are each fixed against rotation by a pin 931 taking into a socket in the base 1. The receiver in the first bank as well as each forward receiver (left Figure 23) takes into a sleeve 107 provided with a slot 96 for the index 95. This sleeve has a bearing in a head 108 fixed to the shaft 91, and a flange on this sleeve has lugs 932, while the head has a lug 933; between these lugs is a spring 109 providing for lost motion between the sleeve and the shaft in one direction for a purpose hereinafter described. By reference to Figure 23, it will be seen that the slots or guides 96 for the indices 95 are formed in the first and second receivers and that these receivers telescope, the first with the sleeve 107, the second with the first receiver and the third with the second receiver. The same holds true for the receivers in the third, fourth, etc., banks, except that the end receiver (upper Figure 18) is specially formed as hereinafter described. Each sleeve 107 (Figure 21) has a lug 934 cooperating with a lug 935 on the first receiver; this provides clearance between the face 936 and the index so as to permit the latter to move freely along the shaft. A similar lug 934 is formed on each receiver (except the forward-upper Figure 18) in the other banks, while all receivers have cooperating lugs 935.

It will, therefore, be seen that when a series of receivers on a shaft are set and the shaft released, the tension of the spring 100 will serve to rotate the shaft and this shaft will continue to rotate until the several indices 95 have cooperated with their stops 94 to indicate the several settings of the receivers on that shaft; accordingly the shaft will be arrested after it has been turned to an extent representing the sum of the digit settings of the partial products in that column represented by that shaft. Now these shafts are arranged in columns corresponding to the digits of the partial products; these partial products are set into the appropriate receivers by the segregating mechanism heretofore described; accordingly the sum of partial products in each column will be accumulated.

Referring to Figures 6, 18, 20 and 23, it will be seen that each shaft 91 has fixed thereto a head 110 provided with stops 111, ten in number, corresponding to the ten digit settings, one of which is the zero setting. It is contemplated that this head 110, therefore, has nine digit settings and a zero setting; accordingly if the head 110 be considered as an indicator it will indicate the settings of the shaft 91. In view of the fact, however, that the partial products in all columns except the first column, Figure 18, may and usually aggregate more than nine, each of the shafts 91 will ordinarily move through more than a complete revolution. This requires that the excess accumulations be transferred to the next higher bank; mechanism for accomplishing this will now be described.

Referring to Figures 18, 20 and 22, each shaft 91, beginning with the second, Figure 18, has fixed thereto a cam 112 having a cam part 113 arranged to cooperate with a toothed sector 114, pivoted on the base 1 and connected with a toothed sector 115 meshing with a rack 117 arranged to slide on the base and having a stop 118 beneath the shaft in the next higher bank and guided in and projecting through a slot in a bracket 119 on the base. The end receiver 930 is formed at its end opposite the stops 94 with stops 940 arranged to cooperate with the stop 118 as an index. The sectors 114 and 115 are connected through a spring 116 which holds cooperating lugs 937 in engagement; accordingly, upon clockwise movement of the sector 114, sector 115 will be moved positively, while upon counter-clockwise movement of 114, the spring will yield and become tensioned if 115 is restrained.

There is thus provided means for transferring the excess setting of one bank into the next higher bank. Thus if, as in the example Figure 30, the receivers in the second bank should have set therein the settings "4"—"6" and "4" aggregating "14"; then upon turning of the shaft in that bank through 1.4 revolutions, the cam 112 will move the sector 114 to the extent of one tooth, thereby moving the index 118 to the right, Figures 20 and 22, one step, thereby permitting the shaft in the next bank to move through an additional step, or one tenth of a revolution. This will move the "4" stop of the head 110 in the second bank to position as required. It will readily be seen that the other transfer mechanisms will operate in the same manner. It will also be noted that the circular part of the cam 112 will always maintain the segment 114 in position against movement; the stop 118 is moreover positively retracted, for the spring 116 comes into play only upon reverse movement of the cam 112 upon resetting, as will be hereafter described.

Upon reference to Figure 30, it will be seen that whenever a given multiplier and a given multiplicand are set upon the keyboard, then upon operation of the machine, as hereinafter described, not only will the partial products be set up, but these partial products will be set into the proper receivers in accordance with the orders of the partial products. Not only will these partial products, thus segregated, be accumulated or integrated, but the excess accumulations will be transferred each to its higher order. Accordingly, the stops 111 on the heads 110 will be in position with respect to points of reference or indices where they will indicate the final product. This final product may be read directly from the heads by providing them with suitable indications as shown in Figure 20; however, means are provided for registering and recording the final product as well as the settings of mulitplier and multiplicand; this will now be described.

Registering and recording mechanism

Referring to Figures 1 to 6, 18 and 28, cooperating with each head 110 is a slide 120 guided in a support 121 and provided with a lug 122 urged against the stops 111 on the head by a spring 123, but normally held free therefrom. This slide has connected thereto one end of a flexible link 124 (formed of a closely wound spring) guided by a tube 125 also mounted in the support. The other end of the link 124 is attached to an arm 126 loosely pivoted on the shaft 127 and having pivoted thereon a type bar 128 guided at its upper end in a slotted cross-piece 129. The bar 128 is provided with type, running from "0" to "9," arranged to cooperate with a platen 131. In the normal position, the type bar is held away from the platen by a spring 132 and with the "0" below the printing line. All the product bars are connected in the same manner, and they are shown assembled in Figures 1 and 2, at the right of the machine. These bars are moved against the platen in a manner hereafter described.

The multiplier and multiplicand type bars 133 are similar to the product bars and are similarly supported by arms 134, also pivoted on the shaft 127, as shown in Figure 28. Each of these arms 134 is connected by a flexible link 135 (similar to the link 124, and guided in a similar tube 136) to a bar 137 slidably mounted in the machine and properly spaced. Each bar 137 is connected by a spring 138, which causes a laterally projecting pin 139 on the bar to bear against the bar 22, as shown. It will, therefore, be seen that the settings of the multiplier and the multiplicand will be set up in the type bars 133; these bars are shown in Figures 1 and 2 in groups and in appropriate spaced relation. Accordingly, the multiplier, the multiplicand and the product can be recorded on the paper 140, as shown in Figure 27.

Each type bar 128 and 133 is acted upon by a hammer 141 loosely pivoted on a shaft 143 and acted upon by a spring 144. All of these hammers are normally latched by a cross-bar 145 taking over lugs 146 on the hammers; this cross-bar is pivoted by arms 147 in the frames 142 and is normally retained in engaging position by springs 148. The arms 147 are connected by links 149 with arms 150 fixed to a shaft 151 and connected at the lower ends by a cross-bar 152 arranged to take into slots between teeth 153 on a segment at the end of each arm 126 or 134. Each hammer is also provided with a separate latch 154 provided at its upper end with a hook taking over the lug 146 and held in engagement by a spring 155, while the lower end of the latch has a tip 156 in the path of its respective segment to be struck by the tooth thereon.

Upon setting of the several type bars 128 and 133, Figures 6 and 28, the corresponding latches 154 will be released by the movement of the top teeth 153 against the tips 156. Each latch is also provided with a laterally extending lug 157 arranged to be engaged by a latch of the next higher order, as usual in calculating machine constructions, so that all the latches of the lower order will be disengaged. The bar 145, which is a trip bar, however, remains in engagement and holds all of the hammers 141 retracted. Upon movement of the shaft 151 in a counter-clockwise direction, as hereinafter described, the trip bar 145 will be withdrawn so as to release all the hammers, which have been previously released by their respective latches 154, as well as all hammers of the lower orders; previously, however, to disengagement of the hammers, the bar 152 will move between the teeth of the segments and not only properly aline the set type bars, but also aline those which have been set to "0" position. Accordingly, when the hammers are released, not only will all type bars be firmly held and alined, but the hammers striking against the set type bars will cause them to strike against the paper on the platen and record thereon.

The paper feed, as well as the ribbon feed, may be of any suitable or usual construction, a detail description is, therefore, unnecessary. The platen 131 has previously been referred to; it is provided with the usual means for manipulating the same and permitting the insertion of the paper, which is arranged on a roll 158. The platen is provided with the usual ratchet engaged by a pawl connected by a link 159, Figure 5, with an arm 160, which may be actuated in any suitable manner, as by an arm 161 on the shaft 127, Figure 6. The ribbon is arranged on spools 162, as usual, and has suitable mechanism generally indicated at 163, Figure 3, actuated from any suitable part of the mechanism, as by the lever 164, Figure 24, whereby the ribbon is given a step by step feed upon each operation of the machine.

*Actuating, setting and clearing mechanisms*

Referring to Figures 1, 3, 4, 5 and 26, the motor 4 is provided with a switch 170, whereby it may be started and stopped. The motor shaft 171 has a gear 172, meshing with a gear 173 on a shaft 174, whose end has a gear 175 meshing with a gear 176 on a shaft 177. The shaft 177 has four helical grooves 178 crossing one another, each groove cooperating with its particular nut 179 journaled loosely in a crosshead 180 guided to reciprocate along rails 130 on the base. A clutch 181 is arranged to engage with either nut 179 by a shifter 182 slidably mounted and guided on the crosshead and connected with the clutch. Each nut 179 will rotate with the shaft when not engaged with the clutch; but when either nut is engaged and held against rotation, it will travel along the shaft carrying the crosshead with it; the left nut carrying the crosshead to the left and the right nut carrying it to the right. The clutch shifter 182 is retained in either of its engaging positions by latches 183 held by springs 184 and 192 in engagement with lugs 185 on the shifter. A bumper 186 on each end of the shifter is arranged to strike against a cushion 187 slidable on the frame and retained in projected position by a spring 188. The tail 189 of each latch is arranged to strike against a fixed stop 190 and against a lug 191 on the shifter. The right latch 183 is connected by the spring 192 with an arm 193 pivoted on the crosshead 180 and arranged to be struck by a shoulder 194 on a bar 195, pivoted to an arm 196, which latter is fixed to a shaft 197, extending across the machine and connected to be moved in a clockwise direction, Figure 5, by the trip bar 3, Figure 1. The lower end of the bar 195 projects into a slot in a bracket 198 and is acted upon by a spring 199, tending to retain the bar in its vertical or normal position. The arm 193 extends into a notch in the lug 191 on the shifter 182 and has a shoulder 291 taking behind the lug to hold the clutch in mid position, as shown in Figures 5 and 26.

When the crosshead 180 is moved to the right, to the position shown in Figure 5, the stop 190 will disengage the right latch 183, while the spring 188 will move the shifter until arrested by the shoulder 291; this will cause the clutch 181 to move to neutral position, and the crosshead will stop. If, now, the bar 195 is depressed by movement of the trip bar 3, the arm 193 will be depressed so as to release the shifter and cause the tensioned spring 188 to shift the clutch 181 to the left, in order to clutch the left nut 179; the left latch 183 then holds the clutch engaged. The crosshead will now travel to the left until the left bumper 186 strikes the cushion 187, thereby tensioning the spring 188, while further movement will cause the latch 189 to engage the stop 190, thereby moving the shifter 182 to the right, carrying the clutch 181 with it to disengage the left nut 179; the tensioned spring 188 will now cause the clutch to engage the right nut 179; accordingly, the direction of movement of the crosshead is automatically reversed. As this crosshead travels back, it will again be arrested, as previously described.

It will, therefore, be seen that, upon depression of the trip bar 3, the crosshead will travel back and forth and will be arrested upon its return movement. This is true even if the trip bar remains depressed, for the bar 195 can move against the tension of its spring 199, but, when released, it will move up until its shoulder 194 takes over the arm 193. As hereafter described, a complete reciprocation of the crosshead causes a complete operation of the machine to take place.

Referring to Figures 5, 6, 11, 24 and 25, the crosshead is provided with a laterally projecting cam roll 200, which is normally in the fork of a lever 201, fixed to a shaft 202 and carrying a link 204 provided with a reduced part passing through one arm of a bell crank lever 203 pivoted on the plate 2 and connected by a link 292 (Figures 11 and 25) with an arm 293 on the shaft 20. As the crosshead and cam roll 200 move to the right, Figure 24, the lever 201 is moved to dotted position, thereby raising the frame 18, Figure 11, in order to raise keys which have not been fully depressed and latched and in order to lock all keys which have not been depressed.

A cam 205 on the shaft 202 strikes against a pin 206 on a lever 207 connected through a pin and slot connection with the link 36, Figures 10 and 25. The lever 207 is held by a spring 208 so as to normally hold the lever to the right, Figure 25. Upon movement of the lever 201 and the shaft 202 by the roll 200, the cam 205 will swing the lever 207 idly on account of the lose connection with the link 36, while the spring 208 is tensioned. At the end of this movement, the cam 205 will pass to the other side of the pin 206, permitting the spring 208 to return it to its position shown in Figure 25, but on the other side of the pin. When the roll 200 is returned with the crosshead, it will, in striking the lever 201, move the cam 205 back and by engagement with the pin 206 move the link 36 (to the right, Figure 25, and left, Fig. 10) in order to release the keys, as hereinafter described.

The roll 200 on its continued movement bears against the cam face 209 on a bell crank lever 210 pivoted on the frame and connected by a link 211 with an arm 212 fixed to a shaft 213. This shaft has fixed thereto arms 214 carrying a crossbar 215 arranged to take against lugs 216 on all of the bars 22. The bell crank lever 210 has a pin 217 taking against the cam face on a lever 218 connected by a link 219 to an arm 220 on the shaft 55, Figures 5, 6 and 24, on which the alining bar 54 is fixed. The parts are moved by springs 295 and 296 connected with links 211 and 219 and anchored on the frame. Accordingly, upon movement of the levers 210 and 218, the multiplier and multiplicand setting up bars 22 will not only be released, but will be permitted by their springs to move the tappet 48 and stop 480 and the multiplicand slides 72 and their connected couplers 74 to positions as determined by the depressed keys. The bars 45 are also released for movement, due to the fact that the pin 217 enters the recess in the lever 218, thereby permitting the alining bar 54 to be moved to dotted position, Figure 24, by the spring 296.

Upon continued movement of the roll 200 (Figure 24), it will enter a cam groove 221 in a bell crank lever 222 connected by a link 223 with an arm 224 on a shaft 225, having fixed thereto cams 297 for moving the crosshead 64, in order to position the tappet and stop against the corresponding steps 47, as shown in Figure 28. The partial products are thus set up in the receivers, as heretofore described.

The crosshead 180 has two cam rolls, Figure 5, which travel in grooves in a shaft 227 mounted in suitable bearings and having at one end a gear 228 meshing with a gear 229 on a shaft 230. On this shaft are mounted a series of bevel gears 231, Figures 18 and 20, each of which meshes with a corresponding gear 232 on a shaft 91. The gears 231 are loose on the shaft 230 and each is connected thereto by a sleeve 233 splined on the shaft and connected with the gear hub by a screw thread. The gear is positioned on the shaft by a split ring 236 taking into a groove 237 and maintained by a collar 238 threaded on the gear hub. The gear 231 has a lug 234, Figure 20, arranged to be engaged by a lug 297 on the sleeve 233, but when the shaft 230 and the sleeve splined thereto are turned one complete revolution counter-clockwise, the lugs will be out of mesh axially and thereafter the shaft can travel counter-clockwise without turning the gear while the sleeve 233 travels along the gear hub. Upon reverse movement of the shaft, the gear will be picked up as soon as the lugs 234 and 297 reengage. The grooves on the shaft 227 are in duplicate, Figure 5, and each has a part 239 along the shaft, a part 240 helical of the shaft and another part 241 along the shaft; there is, in fact, a double thread 240 with parts 241 along the shaft. The cam rolls 226 travel in these grooves.

After the cam roll 200 on the crosshead 180 has left the cam 221, Figure 24, and after the partial products have been set into the receivers, the rolls 226 will enter the helical grooves 240 and cause the shaft 227 to rotate the shaft 230 in a counter-clockwise direction, Figure 20, a given number of turns (about four and one-sixth turns). This permits the tensioned springs 100 to rotate the shafts 91 individually to extents as determined by the settings of the respective receivers until these receivers are arrested. The indices for the end (upper Fig. 18) receivers in the first and second banks are arrested by these receivers; but the end receivers in the other banks are arrested by the stops 118, Figure 20, cooperating with the carrying receivers 930, while the other receivers in the several banks are arrested by their indices, each of which is splined on the one adjacent thereto. After any shaft 91 has thus been arrested, the shaft 230 is permitted to continue its movement on account of the connection of the gear with the shaft by the lugs 234 and 297. The settings of the receivers are thus accumulated or integrated and transferred; the final product will thus appear on the heads 110.

After the rolls 226 on the crosshead have left the helical grooves 240 and entered the straight grooves 241, the roll 200 will strike against and enter the groove in a lever 242, Figure 24, fixed to a shaft 243, having an arm 244 connected by a link 245, which is in turn connected with an arm 246 loose on the shaft 127, previously referred to. The arm 246 has a lug 247 taking against a lug 248 on an arm 249 fixed to the shaft 127. Fixed to the shaft 127 are arms 250 connected by a crossbar 251, Figure 6, lying over the arms 126 and 135 carrying the type bars 128 and 133. The arm 249 is acted upon by a spring 252, which tends to move it to the right, Figure 24, against a stop 253. When the arm 242 is moved from full to dotted position, Figure 24, the crossbar 251 will be raised by the spring 252, thereby permitting the arms 126 and 134 to move up under the tension of the springs 123 and 138, so as to position the type bars until arrested by the stops 111 for the product bars and by the engagement of the pins 139 with the bars 22 in the case of the multiplier and multiplicand bars. The final product as well as the multipler and multiplicand are thus set into the type bars 128 and 133, with the corresponding type along the printing line.

The shaft 243 has an arm 254 carrying a roll 255, Figure 24, working in a slot in an arm 256 fixed to a shaft 257 on which is fixed an arm 258, connected by a link 259 with an arm 260 on the shaft 143; this shaft has arms 261 carrying a crossbar 262 taking behind the hammers 141, Figure 6. The arm 254 further has a cam 263 arranged to engage a roll 264 on an arm 265 interconnected with an arm 266, in turn interconnected with an arm 267 acted upon by a spring 268 and fixed to the shaft 151, on which the arm 150, interconnected with the trip bar 145, is mounted, Figure 6. Upon movement of the arm 254 and after the type bars have been set, the arm 256 will be moved to shift the crossbar 262 to the right, Figures 6 and 24, in order to move away from the hammers; while the cam 263 will shift the arm 265 and, through the connections described, move the trip bar 145 to the left, Figure 6, in order to release those hammers which have been previously released by the latches 154. The hammers are, therefore, enabled to strike against the type bars and make an imprint on the paper not only of the multiplier and multiplicand but also of the product.

The operations have now been completed and the machine is in a condition to be restored. As previously described, the crosshead will have arrived at its left limit of travel, Figure 5 (right Figure 24), and will then be automatically reversed. Upon such reversal, the action takes place in the reverse order; the operations are briefly as follows: Upon return of the roll 200, the arm 242 will be swung back to full line position, Figure 24; first, the hammers will be restored by the crossbar 262 and latched by the bar 145, thereby permitting the springs 132 to move the type back to the position shown in Figure 6; the crossbar 251 will be depressed, thereby moving down all of the type bars with their "0's" below the printing line. During the return movement, the rolls 226 will have traveled in the straight grooves 241 and will be ready to enter the helical grooves 240. During the travel along this part 240, the receivers are restored to normal position until stops 269, Figure 20, strike against the brackets 119; there are similar stops provided for all shafts, except those in the first and second banks. Similar stops are not necessary for the latter, because the end receivers are held against rotation by the pins 931, Figure 23. It will be noted that, during this return rotation of the shafts 91, the cams 112 tend to rotate the sectors 114 to push the stops 118 to the left, Figure 20. Since, however, a carrying receiver may not at this time be shifted back, the springs 116 are provided to permit the sectors to move while merely tensioning the springs. As soon as the carrying receivers move, the steps thereof will move under the stops 118 to permit them to snap or move from step to step to final normal positions.

As the shaft 230 moves the shafts 91 back to normal positions, the springs 100 are tensioned to again move the receivers when another problem is set on the keyboard and the machine operated. The receivers are finally set with the lugs 934 against the lugs 935, Figure 21, which are the zero positions. In order to take care of irregularities of connections from the shaft 230 to the various shafts 91, the spring connections, Figures 20, 21 and 23, are provided; for when stops 934 and 935 engage, the springs 109 permit the necessary extra travel in order to insure such engagement.

After the receivers have been restored, the rolls 226 will reenter the straight groove parts 239 and the roll 200 will then engage the cam 221, Figure 24, which causes the movable tappets 48 to be laterally moved back towards the fixed stops. During this movement, the lower movable parts 62, Figures 6 and 14 engage with the lugs 50 on the bars 45 so as to engage these lugs with the lower fixed parts 61 in order to restore the bars 45 to normal positions, thereby restoring all of the receivers and also alining all of the slots 76 in the bars 45. The roll 200 will now engage the cam 209, causing the roll 217 to move the arm 218 and by moving 54 aline the bars 45 while the lost motion between 211 and 212 is taken up. Further movement of the roll 200 causes the bars 22 to be returned by the action of the crossbar 215, Figure 6; this causes the tappets 48 and stops 480 to move down back to normal, while the slides 72 are also moved back to normal.

The roll 200 will now strike the arm 201, Figure 24, causing the connected arm 203 to drop the frame in the keyboard section back to normal, as heretofore described. The cam 205, striking against the pin 206 will cause the link 36 to be shifted in order to release the keys in both sections as heretofore described. This is true provided the "repeat" key is in raised position; if, however, this "repeat" key has been depressed, then the multiplier section will not be cleared. Finally, the return of the crosshead 180 to its normal position, Figure 5, will cause the parts to come to rest with the machine cleared. It will, of course, be understood that, by the connections previously described, the paper feed and the ribbon feed have been operated.

Upon reference to Figure 24, it will be seen that the arm 201 is held in dotted position against a stop 300 by the toggle formed with the link 204. The arm 242 is also held in dotted position, by the arm 244 taking against a stop 301, due to the toggle formed by the arms 244 and 245. The arm 267 is held against a stop 302 when in normal position, and the arm 210 against stop 310 when in advanced position.

Upon reference to Figures 20 and 23, it will be seen that the shafts 91 are retained against endwise movement in brackets 92 by the head 110 on the end of each shaft bearing against thrust washers, while the other end of each shaft has nuts 303.

Résumé of operations

From the preceding description the operations of the machine will be clear, and in Figures 28 to 33 are given various examples showing the operations of multiplying any desired multiplier by any desired multiplicand. Briefly, the operations are as follows:

A desired multiplier is set on the left keyboard and a desired multiplicand on the right keyboard, Figure 1. The motor being in operation, the trip bar 3 is depressed. Thereupon, the several partial products resulting from the multiplication are set up in the multiplier and multiplicand setting up devices. These partial products are then segregated in accordance with their respective orders in the several receivers, with the partial products of the same order in the same bank. The partial products are then accumulated, with the excess accumulation in one order or bank transferred to the next higher order or bank. In this way the final product is set into the heads 110 and appears by the location of the stops 111. This product is then mechanically read by the fingers 120 and set into the product type bars 128. Meanwhile, the reading of the multiplier and multiplicand has been itself set into the multiplier and multiplicand type bars 133. The corresponding hammers, which have been individually unlocked, are now fully released in position, and the printing proceeds. Accordingly, the multiplier and multiplicand, as well as the product, appear on a line, with the items spaced to render the reading thereof easy, as shown in Figure 27. The machine then automatically clears, the operations being performed in the reverse order, and the entire keyboard being ready for receiving and having set into it another multiplier and another multiplicand. If it is, however, desired to repeat a multiplier, then upon depression of the "repeat" key, this multiplier can be maintained in the machine and applied to as many multiplicands as desired. Not only can each keyboard section be cleared independently by the depression of the "clear" key, but each column can also be cleared independently by manipulation of its own "clear" key.

While the machine has been particularly described as a multiplying machine and while the examples given are those of multiplication, it will be readily seen that the machine is capable of performing the operations of division; for division may be performed in a manner well known to those skilled in the art, as by the employment of reciprocals or by suitable designations of keys. It will, therefore, be understood that the terms "multiplication", "multiplier", "multiplicand" and "product" are used in their general and descriptive sense to include their reciprocals, namely: "divisions", "divisior", "dividend" and "quotient".

It will further be obvious that various changes may be made in details, within the scope of the appended claims, without departing from the spirit of this invention; it is, therefore, to be understood that this invention is not to be limited to the details described and shown.

Having thus described the invention what is claimed is:

1. In a calculating machine, the combination with selective manipulative means for setting up a multi-digit multiplier and multiplicand, of means controlled by the multiplier means for concurrently setting up all the various resulting partial products corresponding to the multiplication of the various digits in each order by the digits of the multiplier set up, and means controlled by the multiplicand means for selecting from the various set up partial products those corresponding to the set digits in the orders of the multiplicand set up.

2. In a calculating machine, the combination with selective manipulative means for setting up a multi-digit multiplier and multiplicand, of means controlled by the multiplier means for concurrently setting up all the various resulting partial products corresponding to the multiplication of the various digits in each order by the digits of the multiplier set up, means controlled by the multiplicand means for selecting from the various set up partial products those corresponding to the set digits in the orders of the multiplicand set up, and means for segregating the selected partial products in accordance with the orders thereof.

3. In a calculating machine, the combination with selective manipulative means for setting up a multi-digit multiplier and multiplicand, of means controlled by the multiplier means for concurrently setting up all the various resulting partial products corresponding to the multiplication of the various digits in each order by the digits of the multiplier set up, means controlled by the multiplicand means for selecting from the various set up partial products those corresponding to the set digits in the orders of the multiplicand set up, and means for accumulating the selected partial products in order to obtain the final product.

4. In a calculating machine, the combination with selective manipulative means for setting up a multi-digit multiplier and multiplicand, of means controlled by the multiplier means for concurrently setting up all the various resulting partial products corresponding to the multiplication of the various digits in each order by the digits of the multiplier set up, means controlled by the multiplicand means for selecting from the various set up partial products those corresponding to the set digits in the orders of the multiplicand set up, means for segregating the selected partial products in accordance with the orders thereof, and means for accumulating the partial products as segregated in the several orders.

5. In a calculating machine, the combination with selective manipulative means for setting up a multi-digit multiplier and a multi-digit multiplicand, of a series of elements corresponding to the digits of the multiplicand and controlled by the multiplier means to set up all the various resulting partial products corresponding to the multiplication of the various digits in each order by the digits of the multiplier, and means controlled by the multiplicand means for selecting from the various elements those corresponding to set digits in the orders of the multiplicand.

6. In a calculating machine, the combination with selective manipulative means for setting up a multi-digit multiplier and a multi-digit multiplicand, of a series of elements corresponding to the digits of the multiplicand and shiftable by the multiplier means in accordance with all the various resulting partial products corresponding to the multiplication of the various digits in each order by the digits of the multiplier, and means controlled by the multiplicand means for selecting from the various elements those corresponding to the set digits in the orders of the multiplicand.

7. In a calculating machine, the combination with selective manipulative means for setting up a multi-digit multiplier and a multi-digit multiplicand, of a series of elements corresponding to the digits of the multiplicand and formed in accordance with all the various resulting partial products corresponding to the multiplication of the various digits in each order by the digits of the multiplier, and means controlled by the multiplicand means for selecting from the various elements those corresponding to the set digits in the orders of the multiplicand.

8. In a calculating machine, the combination with selective manipulative means for setting up a multi-digit multiplier and a multi-digit multiplicand, of a series of elements corresponding to the digits of the multiplicand and having steps corresponding to all the various resulting partial products resulting from the multiplication of the various digits in each order by the digits of the multiplier, means controlled by the multiplier means for cooperating with said steps, and means controlled by the multiplicand means for selecting from the various elements those corresponding to set digits in the orders of the multiplicand.

9. In a calculating machine, the combination with selective manipulative means for setting up a multi-digit multiplier and a multi-digit multiplicand, of a series of shiftable elements corresponding to the digits of the multiplicand and having steps corresponding to all the various resulting partial products resulting from the multiplication of the various digits in each order by the digits of the multiplier, tappets controlled by the multiplier means for engaging said steps, and means controlled by the multiplicand means for selecting from the various elements those corresponding to the set digits in the orders of the multiplicand.

10. In a calculating machine, the combination with selective manipulative means for setting up a multi-digit multiplier and a multi-digit multiplicand, of a series of elements corresponding to the digits of the multiplicand and having steps corresponding to the various partial products, a tappet positioned by the multiplier means to engage concurrently a series of said steps, and means controlled by the multiplicand means for selecting from the various elements those corresponding to the set digits in the orders of the multiplicand.

11. In a calculating machine, the combination with selective manipulative means for setting up a multi-digit multiplier and a multi-digit multiplicand, of a series of shiftable elements corresponding to the digits of the multiplicand and having steps corresponding to the various partial products, a shiftable tappet positioned by the multiplier means to engage concurrently a series of said steps, and means controlled by the multiplicand means for selecting from the various elements those corresponding to the set digits in the orders of the multiplicand.

12. In a calculating machine, the combination with selective manipulative means for setting up a multi-digit multiplier and a multi-digit multiplicand, of means controlled by the multiplier means for concurrently setting up the partial products resulting from the multiplication of the various digits in each order by the digits of the multiplier, and means controlled by the multiplicand means for selecting the partial products corresponding to the set digits in the orders of the multiplicand.

13. In a calculating machine, the combination with selective manipulative means for setting up a multi-digit multiplier and a multi-digit multiplicand, of a series of elements corresponding to the digits of the multiplicand and shiftable in accordance with the partial products resulting from the multiplication of the various digits in each order by the digits of the multiplier, means controlled by the multiplier for shifting such elements in accordance with the various resulting partial products corresponding to the multiplier, and means controlled by the multiplicand means for selecting from the various elements those corresponding to the set digits in the orders of the multiplicand.

14. In a calculating machine, the combination with selective manipulative means for setting up the multiplier and the multiplicand, of groups of elements corresponding to the orders of the multiplier, each group having a series of elements corresponding to the digits of the multiplicand and formed in accordance with the partial products resulting from the multiplication of the various digits by the multiplier of the corresponding order, means controlled by the multiplier means for cooperating with said elements, and means controlled by the multiplicand means for selecting from the various elements those corresponding to the set digits in the orders of the multiplicand.

15. In a calculating machine, the combination with selective manipulative means for setting up the multiplier and the multiplicand, of groups of elements corresponding to the orders of the multiplier, each group having a series of elements corresponding to the digits of the multiplicand and shiftable in accordance with the partial products resulting from the multiplication of the various digits by the multiplier of the corresponding order, means controlled by the multiplier means for shifting said elements, and means controlled by the multiplicand means for selecting from the various elements those corresponding to the set digits in the orders of the multiplicand.

16. In a calculating machine, the combination with selective manipulative means for setting up a multi-digit multiplier and a multi-digit multiplicand, of a series of elements controlled by the multiplier means to set up the partial products resulting from the multiplication of the various digits in each order by the digits of the multiplier, a series of receivers, and means controlled by the multiplicand means for connecting elements corresponding to the set digits in the orders of the multiplicand with the corresponding receivers.

17. In a calculating machine, the combination with selective manipulative means for setting up a multi-digit multiplier and a multi-digit multiplicand, of a series of elements controlled by the multiplier means to set up the partial products resulting from the multiplication of the various digits in each order by the digits of the multiplier, a series of receivers arranged in the same orders as the partial products, and means controlled by the multiplicand means for connecting elements corresponding to the set digits in the orders of the multiplicand with corresponding receivers of the same orders as the partial products set up.

18. In a calculating machine, the combination with selective manipulative means for setting up the multiplier and the multiplicand, of groups of elements corresponding to the orders of the multiplier, each group having a series of elements corresponding to the digits of the multiplicand and controlled by the multiplier means to set up the partial products resulting from the multiplication of the various digits in each order by the digits of the multiplier, and means controlled by the multiplicand means for selecting from each group elements corresponding to the set digit of the multiplicand.

19. In a calculating machine, the combination with selective manipulative means for setting up the multiplier and the multiplicand, of groups of elements corresponding to the orders of the multiplier, each group having a series of elements corresponding to the digits of the multiplicand and controlled by the multiplier means to set up the partial products resulting from the multiplication of the various digits by the multiplier, a series of receivers, and means controlled by the multiplicand means for connecting with corresponding receivers, elements from each group corresponding to the set digit of the multiplicand.

20. In a calculating machine, the combination with selective manipulative means for setting up the multiplier and the multiplicand, of groups of elements corresponding to the orders of the multiplier, each group having a series of elements corresponding to the digits of the multiplicand and controlled by the multiplier means to set up the partial products resulting from the multiplication of the various digits by the multiplier, a series of receivers arranged in the same orders as the partial products, and means controlled by the multiplicand means for selecting from each group elements corresponding to the set digit of the multiplicand and for connecting said elements to receivers of the same orders.

21. In a calculating machine, the combination with selective manipulative means for setting up a multi-digit multiplier and a multi-digit multiplicand, of a series of elements corresponding to digits and controlled by the multiplier means to set up the various partial products resulting from the multiplication of the various digits by the set digit of the multiplier, and means controlled by the multiplicand means for selecting an element corresponding to the digit setting of the multiplicand means.

22. In a calculating machine, the combination with selective manipulative means for setting up the multiplier and the multiplicand, of groups of elements corresponding to the orders of the multiplier, each group having series of elements corresponding to digits and controlled by the multiplier means to set up the various partial products resulting from the multiplication of the various digits by the set digit of the multiplier, and means controlled by the multiplicand means for selecting in the various groups, elements corresponding to the digit settings of the multiplicand.

23. In a calculating machine, the combination with selective manipulative means for setting up a multi-digit multiplier and a multi-digit multiplicand, of a series of elements corresponding to the digits, means controlled by the multiplier means for shifting said elements in accordance with the various partial products, resulting from the multiplication of the various digits by the set digit of the multiplier, a series of receivers, and means controlled by the multiplicand means for connecting an element, corresponding to the multiplicand digit setting, with the corresponding receiver.

24. In a calculating machine, the combination with selective manipulative means for setting up the multiplier and the multiplicand, of groups of elements corresponding to the orders of the multiplier, each group having a series of elements corresponding to the digits, means controlling by the multiplier means for shifting said elements in accordance with the various partial products resulting from the multiplication of the various digits by the set digit of the multiplier, a series of receivers, and means controlled by the multiplicand means for connecting in each group an element, corresponding to the multiplicand digit setting, with the corresponding receiver.

25. In a calculating machine, the combination with selective manipulative means for setting up the multiplier and the multiplicand, of a series of pairs of elements arranged in orders and corresponding in each order numerically to digits, means controlled by the multiplier means for shifting said elements in accordance with the various partial products resulting from the multiplication of the various digits by the set digit of the multiplier, a series of receivers arranged in orders, and means controlled by the multiplicand means for connecting a pair of elements, corresponding to the multiplicand digit setting, with receivers of the same orders as the partial products.

26. In a calculating machine, the combination with selective manipulative means for setting up the multiplier and the multiplicand, of groups of elements corresponding to the orders of the multiplier, each group having a series of pairs of elements corresponding numerically to digits, means controlled by the multiplier means for shifting said elements in accordance with the partial products resulting from the multiplication of the various digits by the set digit of the multiplier, a series of receivers arranged in orders, and means controlled by the multiplicand means for connecting in each group a pair of elements, corresponding to the multiplicand digit setting, with receivers of the same orders as the partial products.

27. In a calculating machine, the combination with selective manipulative means for settting up the multiplier and the multiplicand, of a series of elements arranged in orders and corresponding in each order numerically to digits, means controlled by the multiplier means for shifting said elements in accordance with the various partial products resulting from the multiplication of the various digits by the set digit of the multiplier, a series of receivers arranged in orders corresponding to the partial products, and means controlled by the multiplicand means for connecting elements corresponding to the digit settings of the multiplicand with corresponding receivers.

28. In a calculating machine, the combination with selective manipulative means for setting up the multiplier and the multiplicand, of groups of elements corresponding to the orders of the multiplier, each group having a series of elements corresponding numerically to digits, means controlled by the multiplier means for setting the elements in each group in accordance with the various partial products corresponding to the settings of the multiplier, a series of receivers arranged in accordance with the orders of the partial products, and means for connecting elements from each group, corresponding to the digit settings of the multiplicand, with corresponding receivers.

29. In a calculating machine, the combination with selective manipulative means for setting up the multiplier and the multiplicand, of groups of elements corresponding to the orders of the multiplier, each group having pairs of elements corresponding numerically to digits, means controlled by the multiplier means for setting a pair of elements in each group in accordance with the various partial products corresponding to the settings of the multiplier, a series of receivers arranged in orders corresponding to the orders of the partial products, and means for connecting pairs of elements from each group, corresponding to the digit settings of the multiplicand, with corresponding receivers.

30. In a calculating machine, the combination with selective manipulative means for setting up the multiplier and the multiplicand, of a series of elements arranged in orders and corresponding in each order numerically to digits and controlled by the multiplier means to set up the various partial products corresponding to the settings of the multiplier, coupling means controlled by the multiplicand means and adapted to cooperate with said elements in accordance with the digit settings of the multiplicand, and receiving means connected with said coupling means.

31. In a calculating machine, the combination with selective manipulative means for setting up the multiplier and the multiplicand, of a series of elements corresponding in each order numerically to digits and controlled by the multiplier means to set up the various partial products corresponding to the settings of the multiplier, a series of couplers corresponding to the orders of the multiplicand, means controlled by the multiplicand means for causing each of the several couplers to cooperate with said elements in accordance with the digit settings of the multiplicand, and receiving means connected with said couplers.

32. In a calculating machine, the combination with selective manipulative means for setting up the multiplier and the multiplicand, of groups of elements corresponding to the orders of the multiplier, each group having a series of elements corresponding numerically to digits and controlled by the multiplier means to set up the various partial products, a series of couplers corresponding to the orders of the multiplicand, means controlled by the multiplicand for causing each of the several couplers to cooperate with the elements in each group in accordance with the digit settings of the multiplicand, and receiving means connected with said couplers.

33. In a calculating machine, the combination with selective manipulative means for setting up the multiplier and the multiplicand, of groups of elements corresponding to the orders of the multiplier, each group having a series of elements corresponding numerically to digits and controlled by the multiplier means to set up the various partial products, a group of couplers for each order of the multiplicand, each group having a coupler for each group of elements, means controlled by the multiplicand for causing each of the several couplers to cooperate with the elements in each group in accordance with the digit settings of the multiplicand, and receiving means connected with said couplers.

34. In a calculating machine, a series of elements arranged in groups and corresponding in each group numerically to digits, each element having means corresponding to the partial products of the digits represented by that element, and setting means movable to selectively engage said last mentioned means and adapted to cooperate concurrently with all of said elements.

35. In a calculating machine, a series of elements arranged in groups and corresponding in each group numerically to digits, each element having means corresponding to the partial products of the digit represented by that element, setting means movable to selectively engage said last mentioned means and adapted to cooperate concurrently with all of said elements, and receiving means adapted to selectively cooperate with any of said elements.

36. In a calculating machine, a series of elements arranged in groups and corresponding in each group numerically to digits, each element having means corresponding to the partial products of the digit represented by that element, setting means movable to selectively engage said last mentioned means and adapted to cooperate concurrently with all of said elements, and a series of receiving means adapted to selectively cooperate with said elements.

37. In a calculating machine, groups of elements corresponding to the various orders, each group having a series of elements corresponding to digits, each element having means corresponding to the partial products of the digit represented by that element, and means for each group adapted to cooperate concurrently with all of the elements of its group.

38. In a calculating machine, groups of elements corresponding to the various orders, each group having a series of elements corresponding to digits, each element having means corresponding to the partial products of the digit represented by that element, means for each group adapted to cooperate concurrently with all of the elements of its group, and receiving means for each group of elements adapted to selectively cooperate with the elements thereof.

39. In a calculating machine, groups of elements corresponding to the various order, each group having a series of elements corresponding to digits, each element having means corresponding to the partial products, means for each group adapted to cooperate concurrently with all of the elements of its group, and receiving means arranged in groups, each group having means for each group of elements, and the means for each group of elements being adapted to selectively cooperate with the elements thereof.

40. In a calculating machine, groups of elements corresponding to the various orders, each group having pairs of elements corresponding numerically to digits, each pair of elements having steps corresponding to the partial products of the digit represented by that pair, and a tappet for each group adapted to cooperate concurrently with selected steps on all elements of that group.

41. In a calculating machine, groups of elements corresponding to the various orders, each group having pairs of elements corresponding numerically to digits, each pair of elements having steps corresponding to the partial products of the digit represented by that pair, a tappet for each group adapted to cooperate concurrently with selected steps on all elements of that group, and means for individually positioning said tappets to cause each tappet to cooperate with selected steps for the elements of its group.

42. In a calculating machine, groups of elements corresponding numerically to the various orders, each group having a series of elements corresponding to digits, each element having means corresponding to the partial products of the digit represented by that element, means for each group adapted to cooperate concurrently with all of the elements of its group, groups of coupling means, each coupling group having coupling means for each group of elements and adapted to selectively cooperate with any element thereof, and receiving means connected to said couplings.

43. In a calculating machine, an element having steps corresponding to partial products, a tappet adapted to selectively cooperate with said steps to shift said element, and a stop adapted to arrest said element in various shifted positions.

44. In a calculating machine, an element having pairs of steps corresponding to partial products, a tappet adapted to selectively cooperate with one series of steps to shift said element, and a stop adapted to cooperate with the other series of steps to arrest said element in various shifted positions.

45. In a calculating machine, an element having pairs of steps corresponding to partial products, a tappet, a stop, means for positioning said tappet and said stop to cooperate with a selected pair of steps, and means for shifting said tappet when so positioned.

46. In a calculating machine, a series of elements corresponding to digits, each element having steps corresponding to the partial products of the digit represented by that element, a tappet adapted to selectively cooperate with the steps on all of said elements, and a stop adapted to arrest said elements in various shifted positions.

47. In a calculating machine, a series of elements, each element having pairs of steps corresponding to partial products, a tappet, a stop, means for postioning said tappet and said stop to cooperate with a selected step of one pair on each element, and means for shifting said tappet when so positioned.

48. In a calculating machine, a series of mutually engaging receivers arranged in alinement, means for setting said receivers, and means for accumulating the settings of said receivers by their mutual engagement.

49. In a calculating machine, a series of receivers arranged in alinement, each receiver having stops corresponding numerically to digits, indices cooperating with said stops to set the receivers in accordance with selected partial products, and means for accumulating the settings of said receivers.

50. In a calculating machine, a series of receivers arranged in alinement, each receiver having digital stops, an index on one receiver cooperating with the stops of an adjacent receiver to set the same in accordance with a selected partial product, and means for accumulating the settings of said receivers.

51. In a calculating machine, a series of receivers arranged in alinement, each receiver having digital stops, indices cooperating with said stops to set the receivers, means for shifting said indices along their respective receivers to position the same in accordance with a selected partial product, and means for accumulating the settings of said receivers.

52. In a calculating machine, a series of receivers arranged end to end, each receiver having circumferentially arranged steps, an index on a receiver cooperating with the steps on the adjacent receiver, and means for relatively shifting said receivers.

53. In a calculating machine, a series of receivers arranged end to end, each receiver having circumferentially arranged steps, an index on a receiver cooperating with the steps on the adjacent receiver, means for relatively shifting said receivers, and an element arranged at the end of said series to receive the accumulated movement of said receivers.

54. In a calculating machine, a series of receivers arranged end to end, each receiver having circumferentially arranged steps, an index on a receiver cooperating with the steps on the adjacent receiver, and means for rotating the receiver at one end of said series while the receiver at the other end is retained.

55. In a calculating machine, a series of receivers arranged end to end, each receiver having circumferentially arranged steps, an index on a receiver cooperating with the steps on the adjacent receiver, means for rotating the receiver at one end of said series, and means for yieldingly holding the receiver at the other end of said series.

56. In a calculating machine, a receiver having circumferentially arranged steps, an index cooperating therewith, means for relatively shifting said index and said receiver in a direction along said receiver, means for relatively rotating said receiver and said index, and a stop for limiting the return movement of said receiver relative to said index.

57. In a calculating machine, a series of receivers arranged in banks, operating means for a plurality of banks, and a detaching connection between each receiver bank and said operating means.

58. In a calculating machine, a series of receivers arranged in banks, means for shifting the receivers individually in the several banks, operating means for returning said receivers, and a detaching connection between each receiver bank and said operating means.

59. In a calculating machine, a series of receivers arranged in banks with the receivers in a bank arranged end to end, each receiver having digital stops, indices cooperating with said stops, and means for setting said receivers.

60. In a calculating machine, a series of receivers arranged in banks with the receivers in a bank arranged end to end, means for setting said receivers, means for accumulating the settings in each bank, and means for transferring the excess setting from one bank to the next bank.

61. In a calculating machine, a series of receivers arranged in banks with the receivers in a bank arranged end to end, means for setting said receivers, means for accumulating the settings in each bank, and means for transferring the excess setting from one bank to a receiver in the next bank.

62. In a calculating machine, a carrying receiver having digital stops, an index cooperating therewith, and yielding means for shifting said index relative to said receiver.

63. In a calculating machine, a series of elements arranged in groups and corresponding in each group numerically to digits, each element having means corresponding to the partial products of the digit represented by that element, and individually controlled means for each group disposed to cooperate concurrently with all the elements of that group.

64. In a calculating machine, a series of elements arranged in groups and corresponding in each group numerically to digits, each element having means corresponding to the partial products of the digit represented by that element, individually controlled means for each group disposed to cooperate concurrently with all the elements of that group, and receiving means disposed to selectively cooperate with any of said elements.

In testimony whereof we affix our signatures this 31st day of March, 1927.

ADOLF BAUMANN.
CARL P. HORLACHER.